(12) United States Patent
Kato et al.

(10) Patent No.: US 12,271,535 B2
(45) Date of Patent: *Apr. 8, 2025

(54) FOOT-PART INPUT SYSTEM, FOOT-PART POSITION INDICATING INSTRUMENT, FOOT-PART POSITION DETECTING DEVICE, INDICATED POSITION INPUT METHOD USING FOOT-PART INPUT SYSTEM, AND IMAGE PROCESSING SYSTEM USING FOOT-PART INPUT SYSTEM

(71) Applicant: Wacom Co., Ltd., Saitama (JP)

(72) Inventors: So Kato, Saitama (JP); Tatsunosuke Tobita, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/611,584

(22) Filed: Mar. 20, 2024

(65) Prior Publication Data
US 2024/0231509 A1    Jul. 11, 2024

Related U.S. Application Data

(63) Continuation of application No. 17/701,501, filed on Mar. 22, 2022, now Pat. No. 11,977,689, which is a
(Continued)

(30) Foreign Application Priority Data

Mar. 4, 2020 (JP) .................. 2020-036875

(51) Int. Cl.
| | | |
|---|---|---|
| *G06F 3/033* | (2013.01) | |
| *G06T 19/00* | (2011.01) | |
| *G06V 40/10* | (2022.01) | |

(52) U.S. Cl.
CPC ............ *G06F 3/0334* (2013.01); *G06T 19/00* (2013.01); *G06V 40/10* (2022.01)

(58) Field of Classification Search
CPC .. G06F 3/0334; G06F 2203/012; G06F 3/011; G06F 3/012; G06F 3/017;
(Continued)

(56) References Cited

U.S. PATENT DOCUMENTS

| | | |
|---|---|---|
| 2017/0300132 A1 | 10/2017 | Hiroi et al. |
| 2019/0302901 A1 | 10/2019 | Tian |

(Continued)

FOREIGN PATENT DOCUMENTS

| | | |
|---|---|---|
| JP | H09114583 A | 5/1997 |
| JP | H09198188 A | 7/1997 |

(Continued)

OTHER PUBLICATIONS

International Search Report, mailed Dec. 28, 2020, for International Application No. PCT/JP2020/039821, 6 pages. (with English Translation).

*Primary Examiner* — Adam R. Giesy
(74) *Attorney, Agent, or Firm* — Seed IP Law Group LLP

(57) ABSTRACT

Input of various kinds of information to an image processing device by use of a foot part of a user is enabled in order not to cause a difference between an image that changes and a feeling with respect to the motion of the body of the user. Position indicators are disposed at a sole back part of a foot-part position indicating instrument. A foot-part position detecting device receives a position indication signal from the position indicators, detects whether the foot-part position indicating instrument makes forward movement that is movement in the extension direction of a line extended in a direction from a heel-side part toward a toe-side part or makes backward movement that is movement in the exten-
(Continued)

sion direction of a line extended in a direction from the toe-side part toward the heel-side part, and indicates the forward movement and the backward movement to the image processing device.

8 Claims, 19 Drawing Sheets

Related U.S. Application Data continuation of application No. PCT/JP2020/039821, filed on Oct. 23, 2020.

(60) Provisional application No. 62/932,102, filed on Nov. 7, 2019.

(58) Field of Classification Search
CPC ...... G06F 3/041; G06F 3/046; G06F 3/04815; G06F 3/03; G06F 3/0354; G06F 3/038; G06T 19/00; G06V 40/10; A63F 13/21; A63F 13/24; A63F 13/25; A63F 13/428; A63F 13/52; A63F 13/5255
See application file for complete search history.

(56) References Cited

U.S. PATENT DOCUMENTS

| | | |
|---|---|---|
| 2020/0038703 A1 | 2/2020 | Cleary et al. |
| 2020/0253320 A1 | 8/2020 | Guard et al. |

FOREIGN PATENT DOCUMENTS

| | | |
|---|---|---|
| JP | 2002032193 A | 1/2002 |
| JP | 2016174699 A | 10/2016 |
| JP | 2018101234 A | 6/2018 |

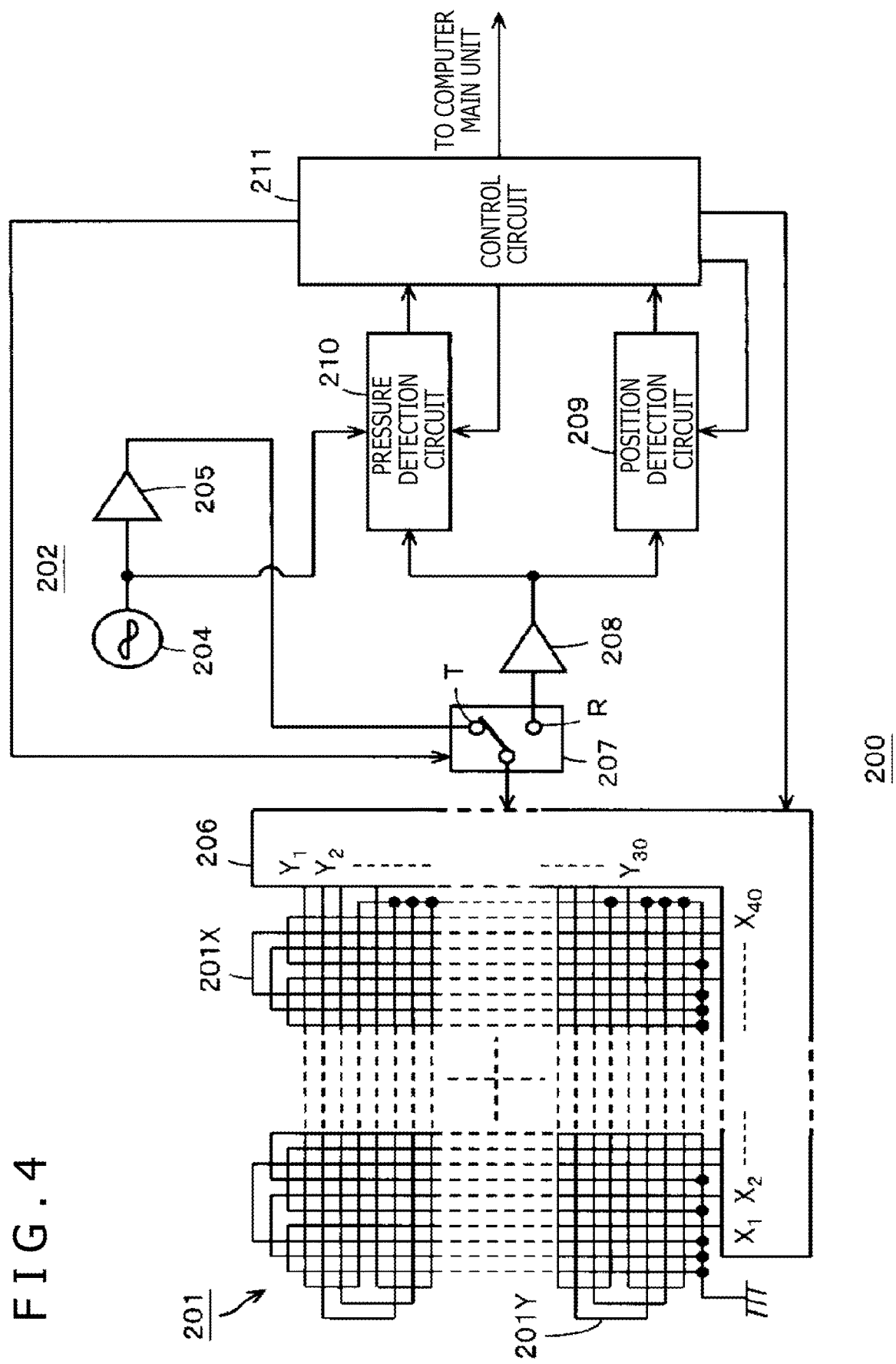

$$\theta = \tan^{-1}(2h/a) \quad \cdots (1)$$

$$\phi = 180 - 2 \cdot \theta \quad \cdots (2)$$

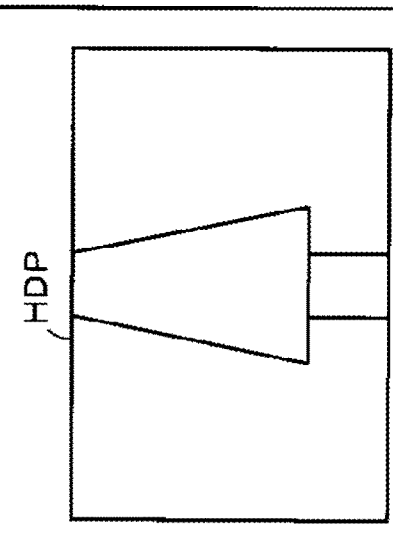
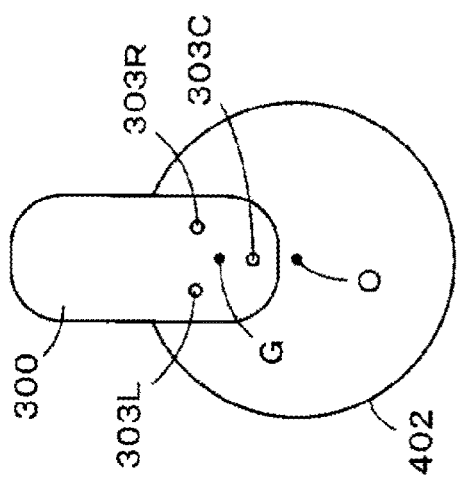
FIG.12C ENLARGEMENT
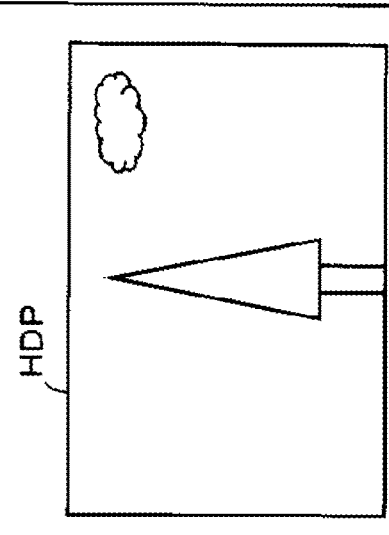
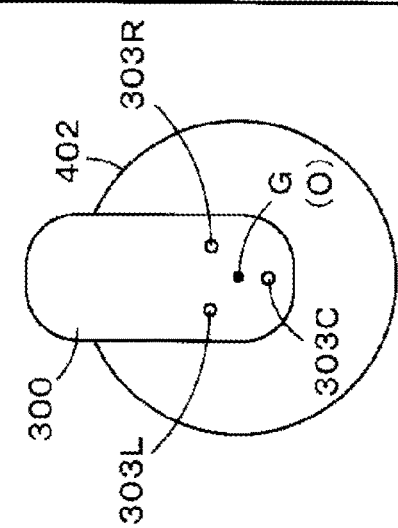
FIG.12B
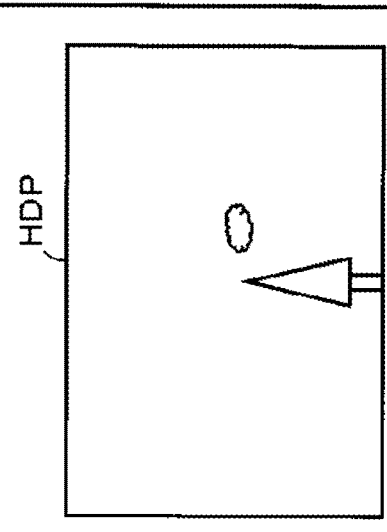
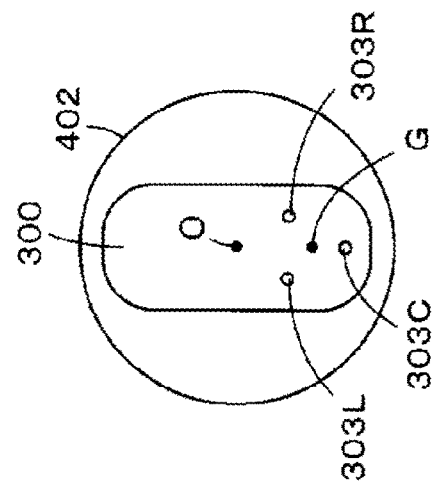
FIG.12A REDUCTION

FOOT-PART INPUT SYSTEM, FOOT-PART POSITION INDICATING INSTRUMENT, FOOT-PART POSITION DETECTING DEVICE, INDICATED POSITION INPUT METHOD USING FOOT-PART INPUT SYSTEM, AND IMAGE PROCESSING SYSTEM USING FOOT-PART INPUT SYSTEM

BACKGROUND

Technical Field

This disclosure relates to a system, a device, and a method for enabling input of information to, for example, an image processing device by use of a foot part of a user.

Description of the Related Art

In recent years, fields of virtual reality (VR), augmented reality (AR), and mixed reality (MR) have been rapidly developing due to improvement in the performance of computers and displays. In execution environments in these fields, in order to carry out operation of a computer with a feeling similar to one in the real world, not existing input devices such as a mouse, a keyboard, and a game pad but a special hand device that senses motion of a hand or a finger of a user is used in some cases. This can reproduce hand gesture such as grasping and handling an object with a hand in a space created by the computer. Attempts to bring gesture by a hand itself of the user in digital content formed by a computer as above have been being carried out.

However, as the reproducibility of operation based on the hand gesture by a hand of the actual user is made higher in the space created by the computer, it become more difficult to carry out operation with use of an operation stick, an operation button, a touch panel, or the like directly operated with a hand. Further, for example, behavior using foots (legs), such as walking movement, is substituted with gesture of a fingertip or the whole of an arm and therefore, using the hand gesture can become a cause of impairing of a sense of immersion as well, which is important in the VR, for example.

Thus, input devices that allow input of information by use of a foot (leg) have been considered. For example, in Japanese Patent Laid-open No. Hei 09-198188 (hereinafter, referred to as Patent Document 1), an disclosure relating to an input device of a foot-operated type that allows input through simple operation with only one foot is disclosed. The input device of the foot-operated type allows change in an indicated position through causing rotational movement, by a foot, of a ball disposed on the sole side. In addition, switches operated by a toe of the foot are disposed, and the input device allows operation similar to what is generally called a left click and right click of a mouse.

Further, in Japanese Patent Laid-open No. 2016-174699 (hereinafter, referred to as Patent Document 2), an disclosure relating to a game controller that can carry out not only measurement of the weight and the center of gravity but also various kinds of action, such as stepping, walking, jumping, and crouching, is disclosed. The game controller is what detects the pressure distribution of a region of contact by part of the body of a player (user) through movement by the player on a sheet having plural pressure sensors and detects the action of the player based on the shape of the distribution and change in the shape.

The disclosure disclosed in Patent Document 1 remains what allows the mouse operated with a hand to be operated with a foot and is not what enables more flexible information input. On the other hand, the disclosure disclosed in Patent Document 2 can detect various action states of the player and therefore, has an effective function as the game controller. However, as a device that carries out information input in a space formed by a computer of the above-described VR, AR, or MR, the state that can be detected is limited, and it is impossible to carry out sufficient input.

Further, by using a controller that allows direction input by a lever and is referred to as what is generally called a joystick, a three-dimensional space image can be changed as if the user moved in a virtual three-dimensional space formed by a VR technique. However, in this case, the three-dimensional space image changes although the body of the user does not move. Therefore, a remarkable difference is caused between the three-dimensional space image that changes and a feeling with respect to the motion of the body of the user, and some users experience a symptom referred to as what is generally called VR sickness.

Thus, there has also been employed a configuration in which a display of a head wearing type referred to as a head-mounted display or the like is used, the motion of the head of the user is detected by a six-axis sensor and so forth mounted in the head-mounted display, and a display image is changed according to the motion of the head of the user. In this case, in a case of moving the position (point of view) of the user in a three-dimensional space image, making indication input by using a foot part will less readily cause a difference between the three-dimensional space image that changes and a feeling with respect to the motion of the body of the user because the indication input by using a foot part is closer to the actual motion of the body in a case where the user moves.

BRIEF SUMMARY

In view of the above, this disclosure intends to enable input of various kinds of information to an image processing device by use of a foot part of a user in order not to cause a difference between an image that changes and a feeling with respect to the motion of the body of the user.

In order to solve the above-described problem, a foot-part input system including a foot-part position indicating instrument mounted on a foot part of a user and a foot-part position detecting device that detects a position indicated by the foot-part position indicating instrument is provided. The foot-part input system, in operation, supplies, to an image processing device, detection output supplied from the foot-part position detecting device. The foot-part position indicating instrument includes a sole part including a sole front part located at a toe-side part of a sole of a foot and a sole back part located at a heel-side part of the sole of the foot and a position indication signal transmitting part that is disposed at one or both of the sole front part and the sole back part and that, in operation, transmits a position indication signal. The foot-part position detecting device includes a position detecting sensor that includes a plurality of electrodes disposed at predetermined intervals in each of a first direction and a second direction intersecting the first direction and that, in operation, receives the position indication signal from the position indication signal transmitting part, and generates output regarding each of the plurality of electrodes. The foot-part position detecting device includes also a detecting circuit that detects, as forward movement, movement of the sole part in a direction that is a direction along a center axis of the sole part in a longitudinal direction and is an extension direction of a line extended in a direction from the heel-side part toward the toe-side part, and detects, as backward movement, movement of the sole part in the extension direction of a line extended in a direction from the toe-side part toward the heel-side part based on an output signal from the position detecting sensor.

According to this foot-part input system, the position indication signal transmitting part that transmits the position indication signal is disposed at one or both of the sole front part and the sole back part of the sole part of the foot-part position indicating instrument. The position detecting sensor of the foot-part position detecting device, in operation, receives the position indication signal from the position indication signal transmitting part and generates output for each of the plural electrodes. The detecting circuit of the foot-part position detecting device, in operation, detects, as forward movement, movement of the sole part in the direction that is the direction along the center axis of the sole part in the longitudinal direction and that is the extension direction of the line extended in the direction from the heel-side part toward the toe-side part, based on the output signal from the position detecting sensor. Further, the detecting circuit of the foot-part position detecting device detects, as backward movement, movement of the sole part in the extension direction of the line extended in the direction from the toe-side part toward the heel-side part. Due to this, the forward movement and the backward movement can easily be indicated to the image processing device by the foot-part input system, and making an instruction to perform processing relating to an image, such as enlargement of the image corresponding to the forward movement and reduction of the image corresponding to the backward movement, is allowed.

BRIEF DESCRIPTION OF THE SEVERAL VIEWS OF THE DRAWINGS

FIG. 4 is a diagram for explaining a configuration example of a foot-part position detecting device according to the first embodiment of the present disclosure;

FIGS. 12A to 12C each depict a diagram for explaining the operation state of the foot-part input system according to the second embodiment of the present disclosure and a display image of a head-mounted display;

DETAILED DESCRIPTION

Systems, devices, and methods according to embodiments of this disclosure will be described below with reference to the drawings.

First Embodiment

Use Example of Foot-part Input System

Figure 1:
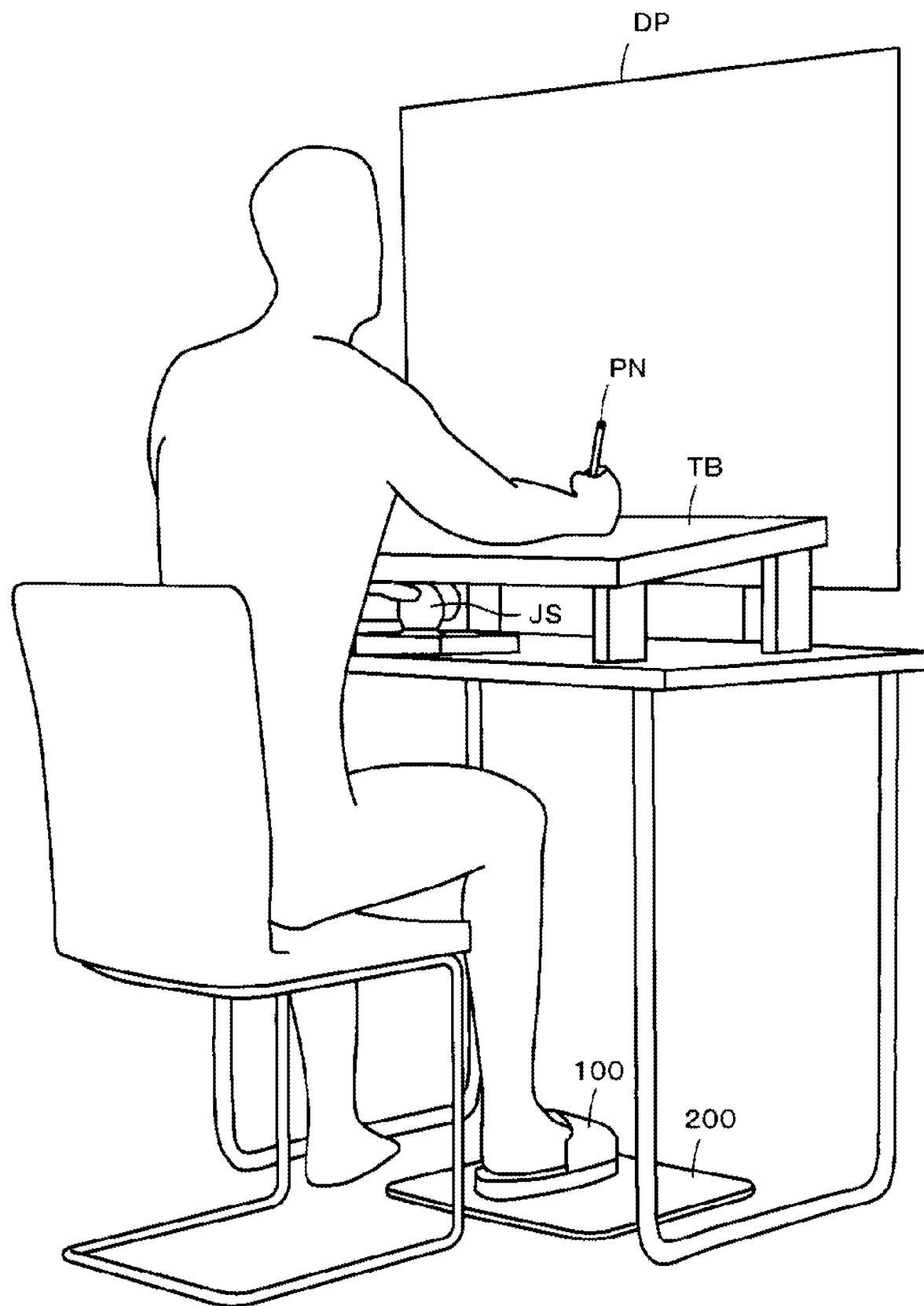
FIG. 1 is a diagram for explaining a use example of a foot-part input system according to a first embodiment of the present disclosure.

FIG. 1 is a diagram for explaining a use example of a foot-part input system of a first embodiment. As illustrated in FIG. 1, a computer rendering system is composed of a pen tablet device TB, an electronic pen PN, what is generally called a joystick JS, a display DP, and a computer main unit, for example. Although the computer main unit is not illustrated in FIG. 1, the pen tablet device TB, the joystick JS, and the display DP are connected to the computer main unit.

In a case of carrying out rendering input by using the computer rendering system, the rendering input is carried out to the pen tablet device TB disposed on a desk, by using the electronic pen PN. An image (rendered image) according to the rendering input is displayed on the display DP. The user can rotate the rendered image in various directions by operating what is generally called the joystick JS, and the user can carry out finer rendering input on a target part in the rendered image, by the electronic pen PN through the pen tablet device TB.

In a case of the computer rendering system of this embodiment, the foot-part input system is allowed to be further used. The foot-part input system is composed of a foot-part position indicating instrument 100 and a foot-part position detecting device 200. As illustrated in FIG. 1, the foot-part position indicating instrument 100 is configured into a slipper shape and is used in such a manner as to be mounted on a foot part of the user. The foot-part position indicating instrument 100 is a cordless instrument that is not connected to another piece of equipment by a cord.

The foot-part position detecting device 200 is a device with a floor mat shape, is located on the lower side of the foot-part position indicating instrument 100, and implements a function of detecting a position indicated by the foot-part position indicating instrument 100. The foot-part position detecting device 200 is allowed to be connected to the computer main unit and supply detection output. Further, operation of, for example, movement, enlargement, reduction, and so forth of a rendered image, the operation having been carried out, in the exiting technology, through operation to an icon displayed on the display DP, is allowed to be carried out by using the foot-part input system.

Specifically, a rendered image can be moved on a display screen of the display DP by moving the foot-part position indicating instrument 100 on the foot-part position detecting device 200. Further, enlargement and reduction of a rendered image can be carried out by raising and lowering the toe side of the foot-part position indicating instrument 100 with the heel side thereof kept contact with the foot-part position detecting device 200. This is one example and various indication inputs can be made through the foot-part input system by a program that runs in the computer rendering system.

As above, the foot-part input system is what can function as an input device (input system) of the computer rendering system. In this embodiment, the foot-part input system allows indication of a position through the foot-part position indicating instrument 100 and sensing of a pressure applied to the foot-part position indicating instrument 100 and notification thereof by an electromagnetic induction system also as described later. Configuration examples of the foot-part position indicating instrument 100 and the foot-part position detecting device 200 that configure the foot-part input system will be specifically described below.

Configuration Example of Foot-Part Position Indicating Instrument 100

Figure 2A:
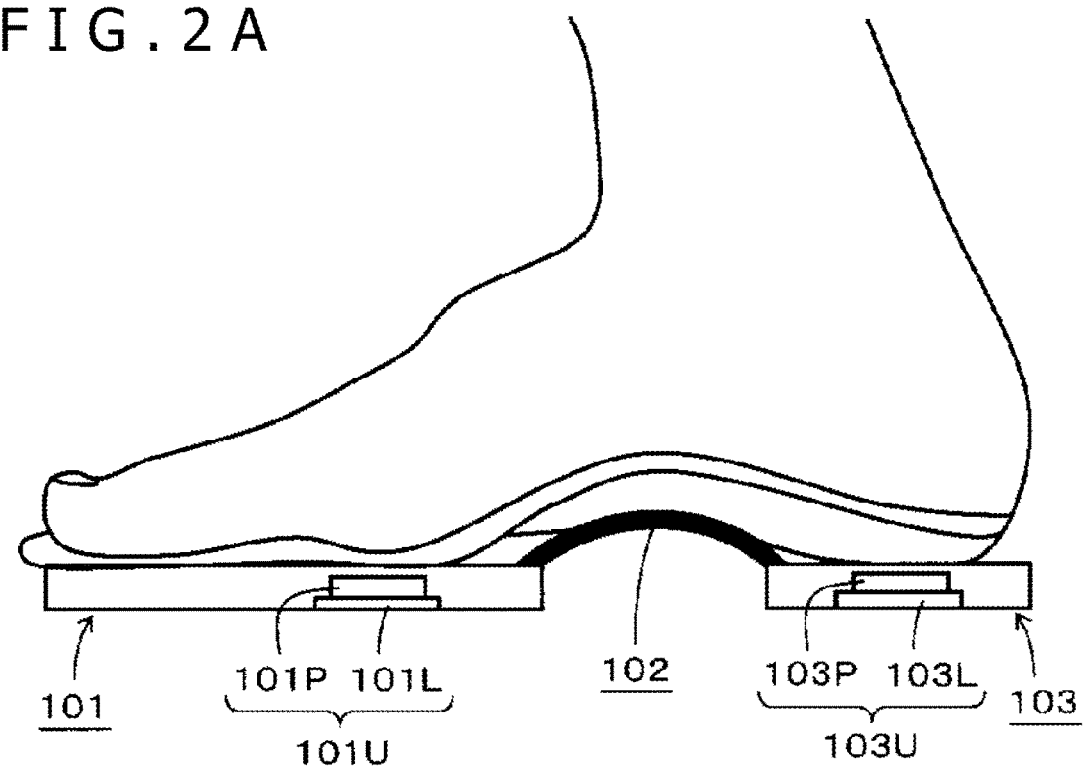
FIGS. 2A and 2B each depict a diagram for explaining a configuration example of a foot-part position indicating instrument according to the first embodiment of the present disclosure.
Figure 2B:
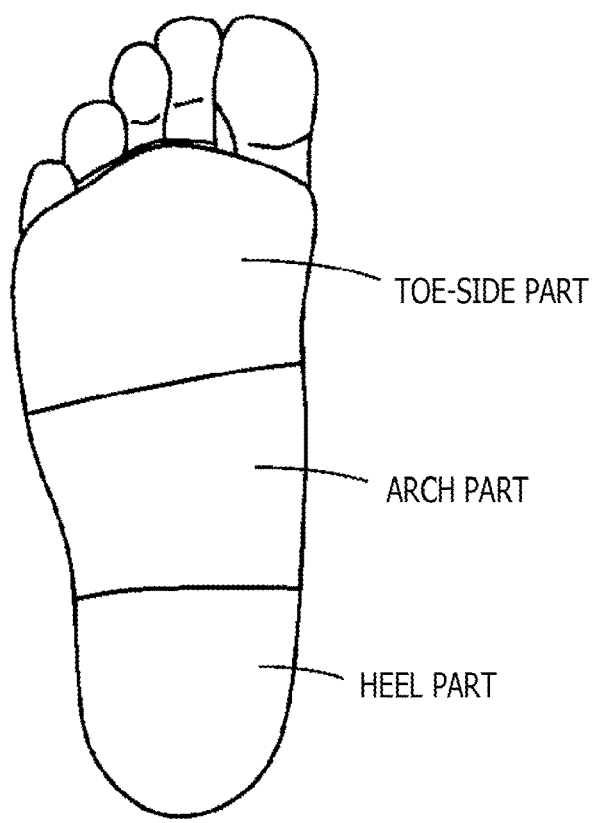

FIGS. 2A and 2B and FIGS. 3A to 3C are diagrams for explaining the configuration example of the foot-part position indicating instrument 100 of the first embodiment. As illustrated in FIG. 2B, the sole of the foot of the user (human) is classified into three parts, that is, a toe-side part, an arch part, and a heel part. As illustrated in FIG. 2A, the foot-part position indicating instrument 100 includes a sole front part 101 located on the lower side of the toe-side part, a sole back part 103 located on the lower side of the heel part, and a sole central part 102 that is located on the lower side of the arch part and connects the sole front part 101 and the sole back part 103 to each other.

Figure 3A:
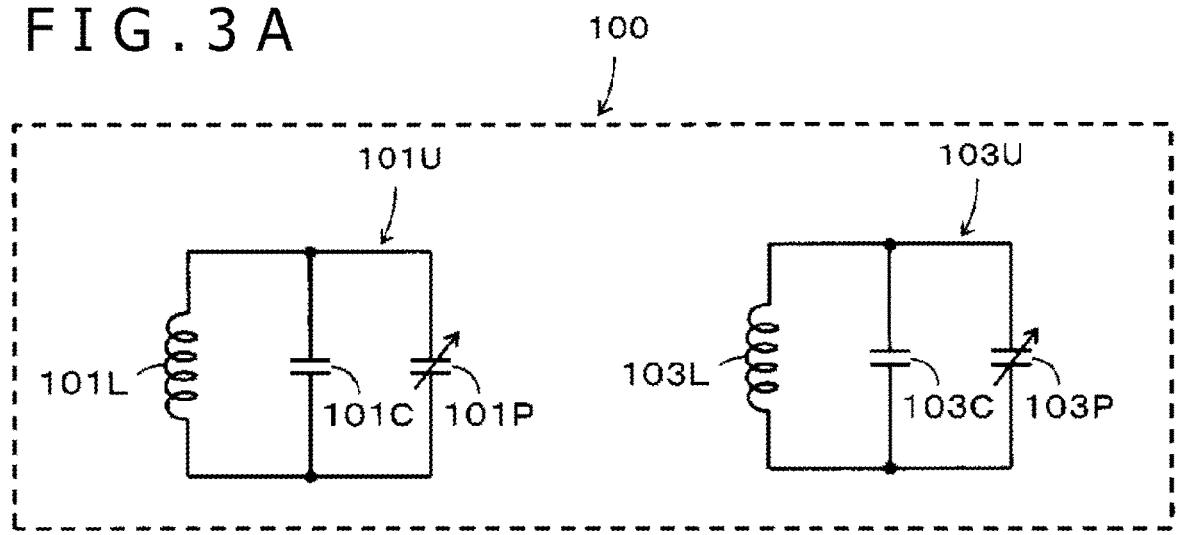
FIGS. 3A to 3C each depict a diagram for explaining a configuration example of the foot-part position indicating instrument according to the first embodiment of the present disclosure.

At the sole front part 101, a position indicating unit 101U including a coil 101L and a pressure sensor 101P is disposed. Further, at the sole back part 103, a position indicating unit 103U including a coil 103L and a pressure sensor 103P is disposed. More specifically, as illustrated in FIG. 3A, the position indicating unit 101U is configured through connection of the coil 101L, a capacitor 101C, and the pressure sensor 101P in parallel. Similarly, the position indicating unit 103U is configured through connection of the coil 103L, a capacitor 103C, and the pressure sensor 103P in parallel.

That is, the position indicating unit 101U configures a resonant circuit through connection of the coil 101L and the capacitor 101C in parallel and implements a function of transmitting a position indication signal by cooperating with the foot-part position detecting device 200 to be described later. Further, the pressure sensor 101P is made into a configuration of a variable-capacitance capacitor and is made into a configuration in which the capacitance changes according to the applied pressure. The pressure sensor 101P is connected in parallel to the resonant circuit configured by the coil 101L and the capacitor 101C to thereby allow change in the phase of the resonant frequency according to the capacitance and transmission of the position indication signal including information on the detected pressure. The position indicating unit 103U is also what is configured similarly to the position indicating unit 101U.

Figure 3B:
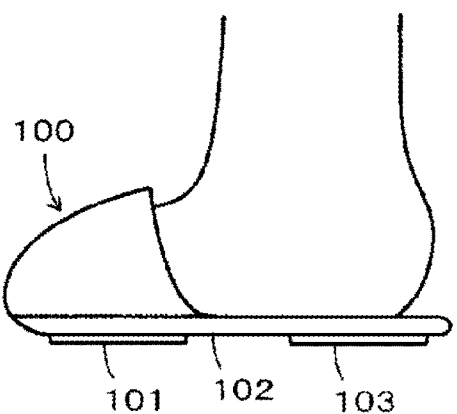
Figure 3C:
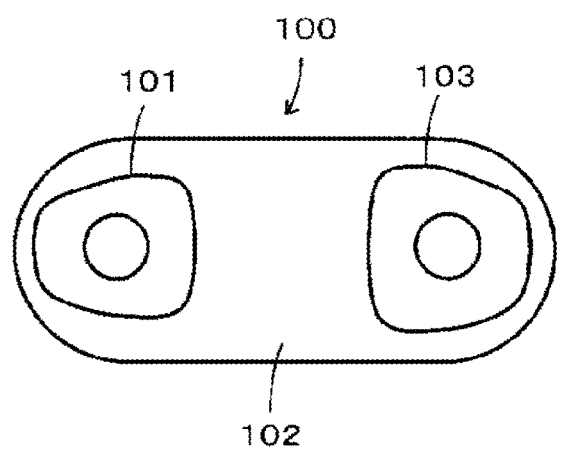

The foot-part position indicating instrument 100 is made into a slipper shape as illustrated in FIG. 1 and FIG. 3B and includes the sole front part 101 and the sole back part 103 as illustrated in FIGS. 3B and 3C. Because the position indicating unit 101U is disposed at the sole front part 101 and the position indicating unit 103U is disposed at the sole back part 103, the respective positions thereof can be indicated and the pressures applied to them can be sensed and notified. Further, as described in detail later, it is possible to input not only the position and the pressure but various kinds of information such as the height and the angle at which the position indicating unit 101U or 103U is located and the angle when the toe-side part of the foot-part position indicating instrument 100 is pivotally moved with the heel part thereof fixed.

In this embodiment, for example, the resonant frequency of the position indicating unit 101U of the sole front part 101 is a frequency f1, and the resonant frequency of the position indicating unit 103U of the sole back part is a frequency f2. As above, the resonant frequencies thereof are made different from each other. This allows the side of the foot-part position detecting device 200 to discriminate and detect the position and the pressure based on the position indication signal from the position indicating unit 101U and the position and the pressure based on the position indication signal from the position indicating unit 103U. That is, the position of each of the sole front part 101 and the sole back part 103 and the pressure applied to each of them can be detected with discrimination.

Configuration Example of Foot-Part Position Detecting Device 200

FIG. 4 is a block diagram for explaining the configuration example of the foot-part position detecting device 200 of this embodiment to which an electromagnetic induction system is applied. The foot-part position detecting device 200 is broadly divided into a position detecting sensor 201 and a position detecting circuit 202. The position detecting sensor 201 is configured through stacking of an X-axis direction loop coil group 201X and a Y-axis direction loop coil group 201Y. Further, as illustrated also in FIG. 1, the position detecting sensor 201 is used in such a manner as to be disposed under the foot of the user and be located on the lower side of the foot-part position indicating instrument 100.

Each of the respective loop coils X1 to X40 of the X-axis direction loop coil group 201X and the respective loop coils Y1 to Y30 of the Y-axis direction loop coil group 201Y that configure electrodes of the position detecting sensor 201 is a coil with one turn in some cases and is a coil with two or more plural turns in other cases. Further, the numbers of loop coils of the loop coil groups 201X and 201Y can also be set to appropriate numbers according to the size of the position detecting sensor 201.

The position detecting circuit 202 is composed of an oscillator 204, a current driver 205, a selection circuit 206, a switching connection circuit 207, a receiving amplifier 208, a position detection circuit 209, a pressure detection circuit 210, and a control circuit 211. The control circuit 211 is configured by a microprocessor. The control circuit 211 controls selection of the loop coil in the selection circuit 206 and switching of the switching connection circuit 207. In addition, the control circuit 211 controls the processing timing in the position detection circuit 209 and the pressure detection circuit 210.

Further, the X-axis direction loop coil group 201X and the Y-axis direction loop coil group 201Y of the position detecting sensor 201 are connected to the selection circuit 206. The selection circuit 206 sequentially selects one loop coil in the two loop coil groups 201X and 201Y. The oscillator 204 generates an alternate current (AC) signal with a frequency f0. The oscillator 204 supplies the generated AC signal to the current driver 205 and the pressure detection circuit 210. The current driver 205 converts the AC signal supplied from the oscillator 204 to a current and sends out the current to the switching connection circuit 207.

The switching connection circuit 207 switches the connection destination (transmission-side terminal T, reception-side terminal R) to which the loop coil selected by the selection circuit 206 is connected, based on control from the control circuit 211. In these connection destinations, the transmission-side terminal T is connected to the current driver 205, and the reception-side terminal R is connected to the receiving amplifier 208. Further, the switching connection circuit 207 is switched to the side of the terminal T in a case of transmitting a signal from the position detecting sensor 201. Conversely, the switching connection circuit 207 is switched to the side of the terminal R in a case of receiving a signal from the external by the position detecting sensor 201.

Further, when the switching connection circuit 207 is switched to the side of the terminal T, the current from the current driver 205 is supplied to the loop coil selected by the selection circuit 206. Due to this, a magnetic field is generated in this loop coil and acts on the resonant circuit included in the position indicating unit 101U or 103U of the foot-part position indicating instrument 100 opposed to this loop coil to allow transmission of a signal (radio wave).

On the other hand, when the switching connection circuit 207 is switched to the side of the terminal R, an induced voltage generated in the loop coil selected by the selection circuit 206 is sent to the receiving amplifier 208 through the selection circuit 206 and the switching connection circuit 207. The receiving amplifier 208 amplifies the induced voltage supplied from the loop coil and sends out the amplified induced voltage to the position detection circuit 209 and the pressure detection circuit 210.

Specifically, in each loop coil of the X-axis direction loop coil group 201X and the Y-axis direction loop coil group 201Y, the induced voltage is generated due to a radio wave (position indication signal) transmitted from the position indicating unit 101U or 103U of the foot-part position indicating instrument 100. The position detection circuit 209 carries out detection of the induced voltage generated in the loop coil, i.e., the received signal, and converts a detection output signal thereof to a digital signal to output it to the control circuit 211. The control circuit 211 calculates the coordinate values of the indicated position regarding the X-axis direction and the Y-axis direction based on the position indication signal from the position indicating unit 101U or 103U, based on the digital signal from the circuit 209 for position detection, i.e., the level of the voltage value of the induced voltage generated in each loop coil.

Meanwhile, the pressure detection circuit 210 carries out synchronous detection of the output signal of the receiving amplifier 208 with the AC signal from the oscillator 204 and obtains a signal at a level based on the phase difference (frequency deviation) between them, and converts the signal based on the phase difference (frequency deviation) to a digital signal to output it to the control circuit 211. The control circuit 211 detects the pressure that is being applied to the pressure sensor 101P or 103P of the position indicating unit 101U or 103U, based on the digital signal from the pressure detection circuit 210, i.e., the level of the signal based on the phase difference (frequency deviation) between the transmitted radio wave and the received radio wave.

Figure 5A:
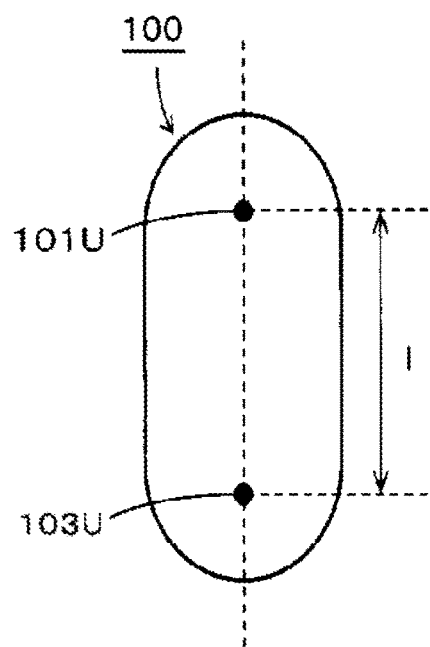
FIGS. 5A and 5B each depict a diagram for explaining height information and angle information that can be input by the foot-part position indicating instrument according to the first embodiment of the present disclosure.
Figure 5B:
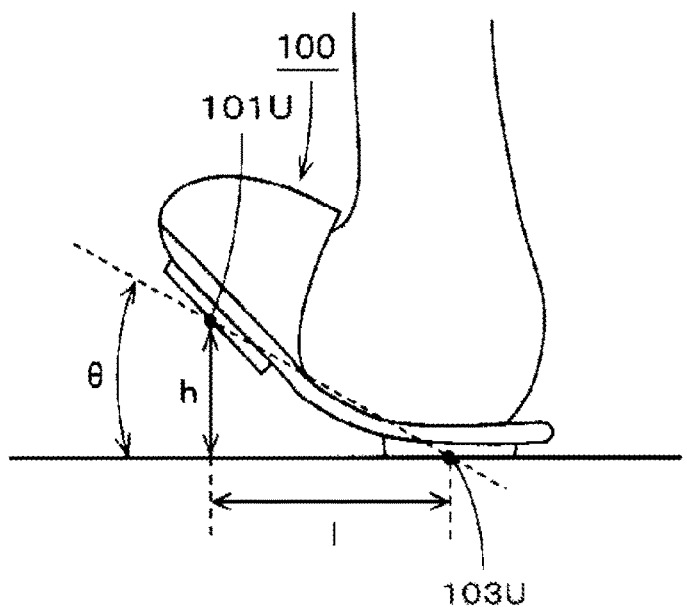

FIGS. 5A and 5B each depict a diagram for explaining height information and angle information that can be input by the foot-part position indicating instrument 100. With the foot-part position indicating instrument 100, as illustrated in FIG. 5B, it is possible to carry out operation in which the sole front part 101 is raised to be separated from the position detecting sensor 201 with the side of the sole back part 103 kept contact with the position detecting sensor 201. In this case, the control circuit 211 can also detect the distance (height) h of the position indicating unit 101U of the foot-part position indicating instrument 100 from the position detecting sensor 201 based on the level of the voltage value of the induced voltage generated in each loop coil.

Further, as illustrated in FIG. 5A, a distance l between the position indicating unit 101U attached to the sole front part 101 and the position indicating unit 103U attached to the sole back part 103 is settled at the timing when they are attached. Thus, the control circuit 211 can also obtain an angle θ formed by the position detecting sensor 201 and the bottom surface of the foot-part position indicating instrument 100, by calculation from "tan θ=h/l."

Moreover, with the foot-part position indicating instrument 100, conversely to the state illustrated in FIG. 5B, it is also possible to carry out operation in which the sole back part 103 is raised to be separated from the position detecting sensor 201 with the side of the sole front part 101 kept contact with the position detecting sensor 201. Also in this case, the height and the angle can be obtained similarly to the case described with use of FIGS. 5A and 5B. That is, the distance (height) of the position indicating unit 103U from the position detecting sensor 201 can be detected. In addition, the angle formed by the position detecting sensor 201 and the bottom surface of the foot-part position indicating instrument 100 in the state in which the sole back part 103 is raised can also be obtained from calculation.

Figure 6A:
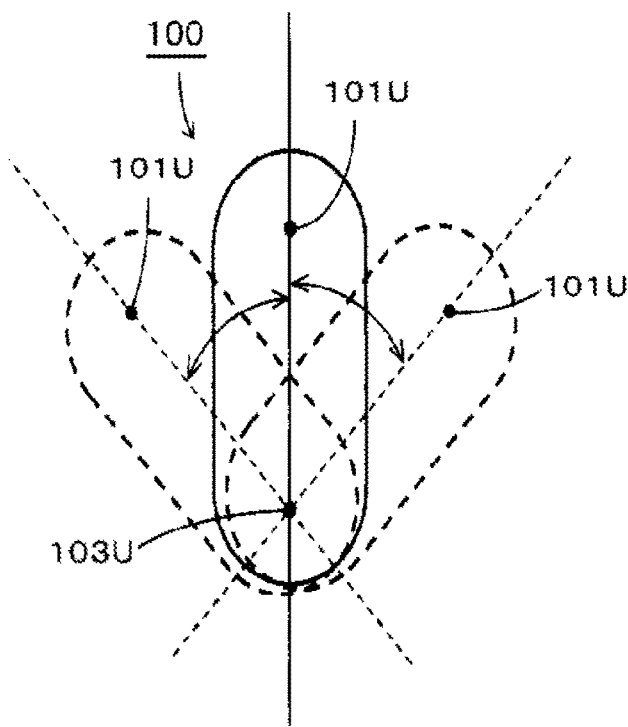
FIGS. 6A and 6B each depict a diagram for explaining angle information that can be input by the foot-part position indicating instrument according to the first embodiment of the present disclosure.
Figure 6B:
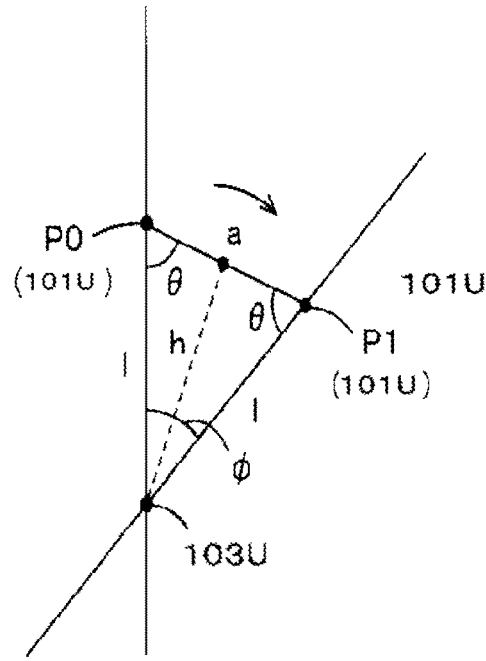

FIGS. 6A and 6B is a diagram for explaining angle information that can be input by the foot-part position indicating instrument 100. With the foot-part position indicating instrument 100, as illustrated in FIG. 6A, the sole front part 101 is allowed to rotate in the left direction or the right direction around the side of the sole back part 103 on the position detecting sensor 201. The control circuit 211 can carry out detection also regarding how far and in which direction the sole front part 101 of the foot-part position indicating instrument 100 is rotated, based on change in the position of the position indicating unit 101U of the foot-part position indicating instrument 100.

For example, suppose that, as illustrated in FIG. 6B, the position of the position indicating unit 103U disposed at the sole back part 103 does not change and the sole front part 101 rotates to the right side as illustrated by an arrow and only the indicated position of the position indicating unit 101U changes. In this case, the length (distance) l between the position indicating unit 103U and the position indicating unit 101U does not change. Therefore, an isosceles triangle in which the position indicating unit 103U is the vertex and an indicated position P0 of the position indicating unit 101U before the rotation and an indication position P1 of the position indicating unit 101U after the rotation are both ends of the base is formed.

The position indicated by the position indicating unit 103U and the positions P0 and P1 indicated by the position indicating unit 101U can be detected in the control circuit 211 as described above. Therefore, a length a of the base including the position P0 and the position P1 as both ends can also be obtained in the control circuit 211. Similarly, the distance between the midpoint of the base and the vertex indicated by the position indicating unit 103U, i.e., a height h of this isosceles triangle, can also be obtained in the control circuit 211.

When the length a of the base and the height h about this isosceles triangle are found out, a base angle θ is obtained based on expression (1) in FIG. 6B. Thus, as indicated in expression (2) in FIG. 6B, a vertex angle φ is obtained when the sum of the two base angles is subtracted from 180 degrees, which is the sum of the internal angles of the triangle. This angle φ is information indicating how far the sole front part 101 is rotated to the right side (amount of rotation) in this example. Also when the sole front part 101 rotates to the left side, only the rotation direction changes and calculation of the amount of rotation can be similarly carried out.

Further, with the foot-part position indicating instrument 100, it is also possible to rotate the sole back part 103 in the left direction or the right direction around the side of the sole front part 101 on the position detecting sensor 201. Also in this case, how far and in which direction of the left and right directions the sole back part 103 is rotationally moved can be detected similarly to the case described with use of FIGS. 6A and 6B. As above, various kinds of information can be input by the foot-part position indicating instrument 100 and therefore, display control of a rendered image with use of these kinds of input information can be carried out.

To cite one example, adjustment of enlargement display of a rendered image can be carried out when the sole front part 101 is raised and lowered without moving the sole back part 103 as described with use of FIGS. 5A and 5B, and adjustment of reduction display of a rendered image can be carried out when the sole back part 103 is raised and lowered without moving the sole front part 101. Further, rotation display of a rendered image to the left and right sides can be carried out when the sole front part 101 is rotationally moved to the left and right sides without moving the sole back part 103 as described with use of FIGS. 6A and 6B. In addition, rotation display of a rendered image to the upper and lower sides can be carried out when the sole back part 103 is rotationally moved to the left and right sides without moving the sole front part 101.

In this case, control can be carried out based on the detected height of the position indicating unit 101U or 103U from the position detecting sensor 201 and the detected angle of the whole of the sole of the foot-part position indicating instrument 100 relative to the position detecting sensor 201. Further, it is also possible to detect the pressure applied to the pressure sensor 101P mounted at the sole front part 101 and the pressure applied to the pressure sensor 103P mounted at the sole back part. Thus, control such as enlarging a rendered image according to the strength of pressing-down of the sole front part 101 and reducing the rendered image according to the strength of pressing-down of the sole back part 103 is also possible. Such control is one example and other various kinds of control are allowed to be carried out according to information input by the foot-part input system, based on the processing program of the computer rendering system.

In the examples described with use of FIGS. 5A and 5B and FIGS. 6A and 6B, either the sole front part 101 or the sole back part 103 of the foot-part position indicating instrument 100 is made contact with the position detecting sensor 201. However, the configuration is not limited thereto. For example, when both the sole front part 101 and the sole back part 103 are separated from the position detecting sensor 201 and are raised and lowered, the state can be detected in the foot-part position detecting device 200 and therefore, for example, display control of a rendered image can be carried out according to this state. Further, it is also possible to allow both the sole front part 101 and the sole back part 103 to be separated from the position detecting sensor 201 and be rotated in the left direction and the right direction. Further, in the foot-part position detecting device 200, the state can also be detected and therefore, for example, display control of a rendered image can also be carried out according to this state.

Effects of First Embodiment

According to the foot-part input system of the above-described first embodiment, various kinds of detailed information, such as the position, the pressure, the height, and the angle, can be input by using a foot part of the user. These pieces of information are detected in the position detecting circuit 202 of the foot-part position detecting device 200, and the detected pieces of information are input to the computer main unit that processes image data and can be utilized as parameters of image processing. Due to this, for example, various instructions of enlargement, reduction, rotation, image quality adjustment of a rendered image, the instructions having been made through indication input with use of a hand of the user in the existing technology, can be made by using the foot-part input system. That is, the foot-part input system enables new input operation for multiple use purposes.

Moreover, in the foot-part input system, due to employment of the electromagnetic induction system, a battery-less structure is made, and the foot-part input system is excellent in the durability. In addition, it also becomes possible for the user to move while wearing the foot-part position indicating instrument 100 on the foot part. Thus, handling becomes easy, and an easy-to-use input device can be provided.

Further, in use scenes of techniques such as VR, AR, and MR, a new input unit can be provided, and more flexible indication input can be implemented. This can implement more flexible information input in fields of VR, AR, and MR.

For example, when a large room is prepared as a VR space and the position detecting sensor 201 is disposed on the whole surface of the room under a user, a large three-dimensional VR object is allowed to be formed in this room, and the user can carry out rendering of the three-dimensional VR object while moving in the room. As above, in use scenes of techniques such as VR, AR, and MR, more flexible indication input is enabled and physical fatigue of the user can be reduced and both fine work and rough work can be carried out, without inhibiting a sense of immersion into the three-dimensional space.

Second Embodiment

Configuration Examples of Foot-Part Input System and Image Processing System

Figure 7:
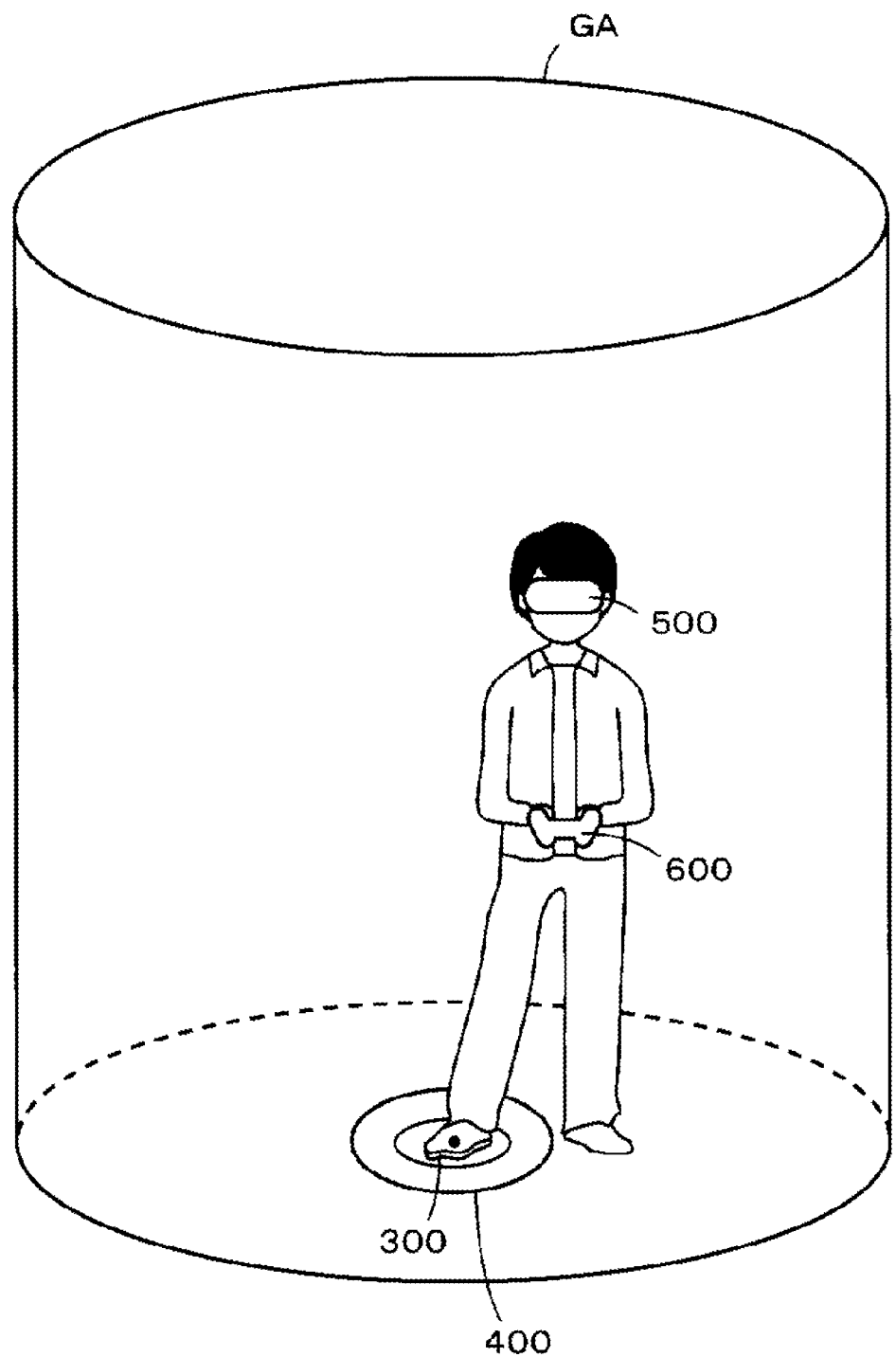
FIG. 7 is a diagram for explaining a use example of a foot-part input system according to a second embodiment of the present disclosure.

FIG. 7 is a diagram for explaining a use example of a foot-part input system of a second embodiment. The foot-part input system of the second embodiment is composed of a foot-part position indicating instrument 300 mounted on a foot part of a user like footwear and a foot-part position detecting device 400 disposed on the lower side of the foot-part position indicating instrument 300, similarly to the foot-part input system of the first embodiment. In the second embodiment, as illustrated in FIG. 7, the foot-part position detecting device 400, a head-mounted display (hereinafter, abbreviated as an HMD) 500, and a game controller 600 are connected to an image processing device 700 to be described in detail later.

The foot-part input system composed of the foot-part position indicating instrument 300 and the foot-part position detecting device 400 and the game controller 600 function as input devices that accept indication input made by the user and supply the accepted indication input to the image processing device 700. The HMD 500 is a display (display device) of a head wearing type and, in this embodiment, is mounted on the head of the user in such a manner as to cover both eyes of the user as illustrated in FIG. 7.

The image processing device 700 is what can form a three-dimensional space image (three-dimensional modeling image) across 360 degrees around the user as illustrated as a 360-degree image region GA in FIG. 7 and supply it to the HMD 500. In this embodiment, the image processing device 700 is what functions as what is generally called a computer game machine that provides a game using the three-dimensional space image to the user.

Figure 8:
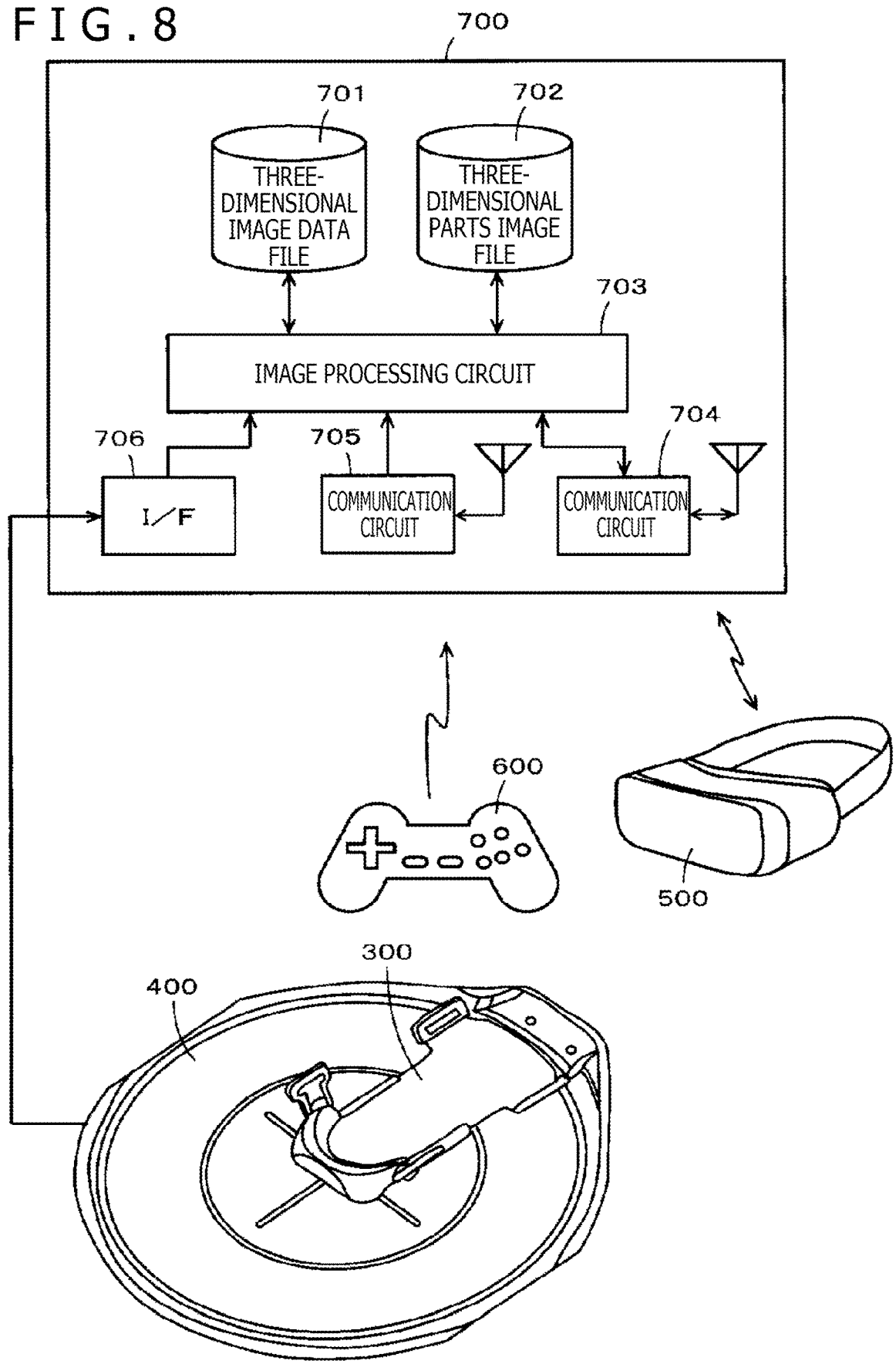
FIG. 8 is a diagram for explaining the overall configuration of an image processing system configured with use of the foot-part input system according to the second embodiment of the present disclosure.

FIG. 8 is a diagram for explaining the overall configuration of an image processing system configured with use of the foot-part input system of the second embodiment. As illustrated in FIG. 8, the image processing device 700 includes a three-dimensional image data file 701, a three-dimensional parts image file 702, an image processing circuit 703, communication circuits 704 and 705, and an interface (I/F) 706. The communication circuit 704 is for mutually carrying out wireless communication with the HMD 500. The communication circuit 705 is for receiving instruction input made by the game controller. The I/F 706 is for accepting detection output supplied from the foot-part position detecting device 400 (indication input with use of the foot-part position indicating instrument 300).

As above, the image processing device 700 and the HMD 500 can bidirectionally communicate wirelessly. Further, the image processing device 700 and the game controller 600 are wirelessly connected, and at least the image processing device 700 can accept instruction input made by the game controller 600. Further, the image processing device 700 and the foot-part position detecting device 400 are connected in a wired manner, and the image processing device 700 can accept detection output supplied from the foot-part position detecting device 400.

Also regarding the HMD 500 and the game controller 600, connection to the image processing device 700 in a wired manner is also possible. However, the HMD 500 and the game controller 600 are what are worn or carried by the user who often changes the orientation of the body. Thus, it is desirable that the HMD 500 and the game controller 600 be connected to the image processing device 700 wirelessly, which means free of anxiety that, for example, the body gets tangled in a connection cord. Moreover, it is also possible to wirelessly connect the foot-part position detecting device 400 and the image processing device 700. However, the foot-part position detecting device 400 does not move in association with movement of the user and therefore, the connection in a wired manner does not cause a problem.

The three-dimensional image data file 701 stores and holds three-dimensional image data that forms a three-dimensional space image. The three-dimensional parts image file 702 stores and holds three-dimensional parts image data for forming various three-dimensional parts images, such as avatars, displayed in the three-dimensional space image. The image processing circuit 703 forms three-dimensional space image data to be supplied to the HMD 500, by using the three-dimensional image data of the three-dimensional image data file 701 and the three-dimensional parts image data of the three-dimensional parts image file 702, and supplies it to the HMD 500.

The HMD 500 includes a display HDP that displays the three-dimensional space image. In addition, the HMD 500 includes, for example, a six-axis sensor configured by a three-axis gyro sensor and a three-axis angular velocity sensor and can detect the rotation direction and the rotation angle. Due to this, the HMD 500 can display, on the display HDP, the three-dimensional space image based on the three-dimensional image data supplied from the image processing device 700 and transmit the detected rotation direction and rotation angle to the image processing device 700. Thus, when the user who wears the HMD 500 on the head makes action of rotating the head to orient the head to the left or right, looking up, or looking down, the six-axis sensor mounted in the HMD 500 detects how far and in which direction the HMD 500 rotates and notifies the image processing device 700 of the result of the detection.

The image processing circuit 703 of the image processing device 700 identifies which direction both eyes of the user are oriented in based on the detection output that the six-axis sensor of the HMD 500 notifies, and forms three-dimensional space image data of the viewing direction thereof to supply it to the HMD 500. This allows the user to view a three-dimensional space image according to the direction in which both eyes of the user are oriented through the display HDP of the HMD 500.

Further, the image processing circuit 703 of the image processing device 700 can create, according to instruction input made by the game controller 600, three-dimensional space image data obtained by addition of a change such as throwing a ball or shooting a gun by an avatar, for example, in the three-dimensional space image displayed on the display of the HMD 500 and supply it to the HMD 500. In this manner, through the display HDP of the HMD 500, the three-dimensional space image that changes according to the instruction input made through the game controller 600 can be viewed.

Moreover, the image processing circuit 703 of the image processing device 700 can carry out enlargement, reduction, and so forth of the three-dimensional space image displayed on the display of the HMD 500, according to the detection output supplied from the foot-part position detecting device 400 (indication input with use of the foot-part position indicating instrument 300). As described in detail later, by moving the foot-part position indicating instrument 300 mounted on a foot part of the user on the foot-part position detecting device 400, the three-dimensional space image displayed on the display of the HMD 500 can be enlarged and reduced and the position of the point of view can be shifted to the right side and be shifted to the left side in the three-dimensional space image.

Specifically, the image processing device 700 can be instructed to enlarge the three-dimensional space image when the foot-part position indicating instrument 300 is moved by sliding on the foot-part position detecting device 400 in a direction which is the longitudinal direction of the foot part and in which the front of the body is oriented. Conversely, the image processing device 700 can be instructed to reduce the three-dimensional space image when the foot-part position indicating instrument 300 is moved by sliding on the foot-part position detecting device 400 in a direction which is the longitudinal direction of the foot part and in which the back of the body is oriented.

Further, suppose that the foot-part position indicating instrument 300 is moved by sliding on the foot-part position detecting device 400 in a direction to the left side of the body, the direction intersecting the longitudinal direction of the foot part. In this case, the position of the point of view can be moved to the left side in the three-dimensional space image, and the three-dimensional space image as viewed from the position after the movement can be displayed. Conversely, suppose that the foot-part position indicating instrument 300 is moved by sliding on the foot-part position detecting device 400 in a direction to the right side of the body, the direction intersecting the longitudinal direction of the foot part. In this case, the position of the point of view can be moved to the right side in the three-dimensional space image, and the three-dimensional space image as viewed from the position after the movement can be displayed.

Due to this, as illustrated in FIG. 7, the user who wears the HMD 500 on the head, holds the game controller 600 with hands, and puts the right foot on which the foot-part position indicating instrument 300 is mounted on the foot-part position detecting device 400 can enjoy a game using the three-dimensional space image. In this case, the user changes the viewing direction by making action of rotating the head to the left or right, looking up, or looking down and can change the three-dimensional space image displayed on the display of the HMD 500, according to the change of the viewing direction.

Further, by operating the game controller 600, display of a three-dimensional image object such as an avatar can be changed in the displayed three-dimensional space image. Moreover, by moving the foot-part position indicating instrument on the foot-part position detecting device 400, enlargement or reduction of the three-dimensional space image or movement of the position of the point of view to the left side or the right side can be carried out.

The rotation of the head is not limited to the case of rotating only the head and includes also the case of rotating the whole of the body of the user. Therefore, as illustrated in FIG. 7, the user can enjoy the game with utilization of the all-around three-dimensional space image of the 360-degree image region GA while freely making rotational movement such as rotating the whole of the body to greatly change the orientation of user's own body. In addition, regarding the three-dimensional space image of any direction, enlargement, reduction, movement of the position of the point of view in the three-dimensional space image to the left side or the right side, and so forth can be carried out through the foot-part position indicating instrument 300 and the foot-part position detecting device 400. As above, the game can be enjoyed in such a manner that the three-dimensional space image is dynamically changed by the rotation of the head and the operation of the foot part.

Configuration Example of Foot-Part Position Indicating Instrument

Figure 9A:
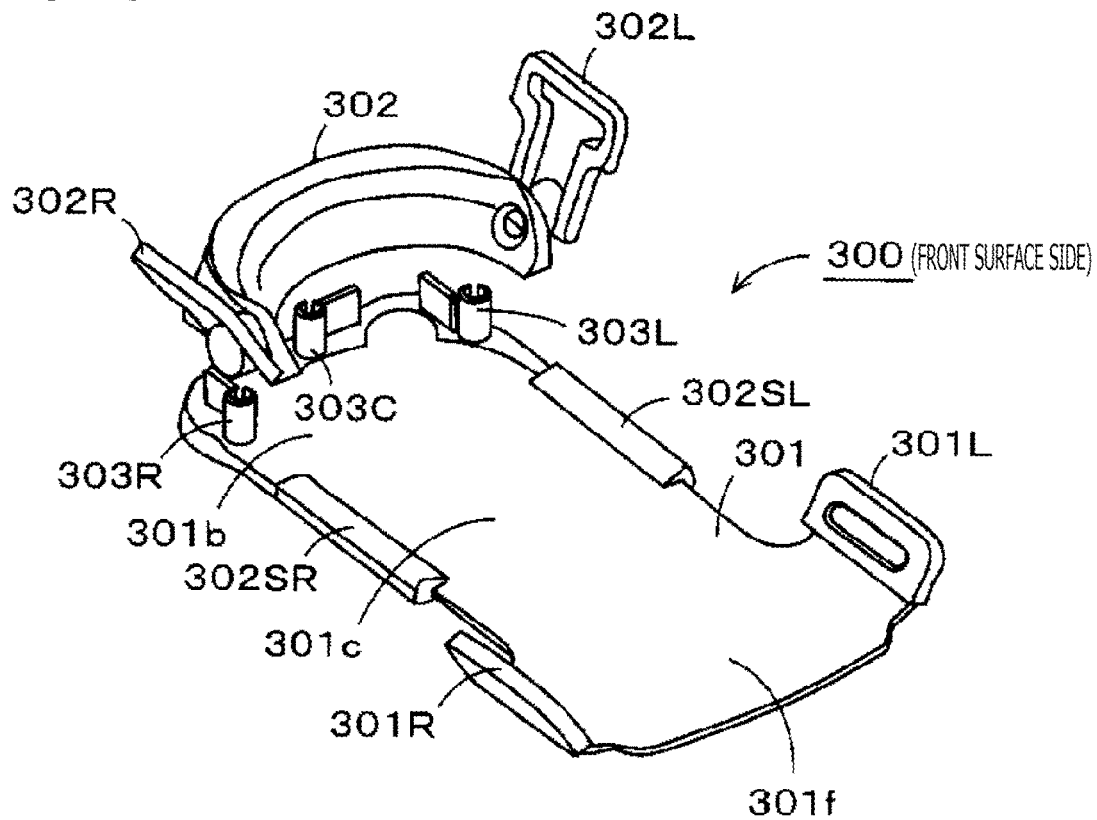
FIGS. 9A and 9B each depict a diagram for explaining a configuration example of a foot-part position indicating instrument according to the second embodiment of the present disclosure.
Figure 9B:
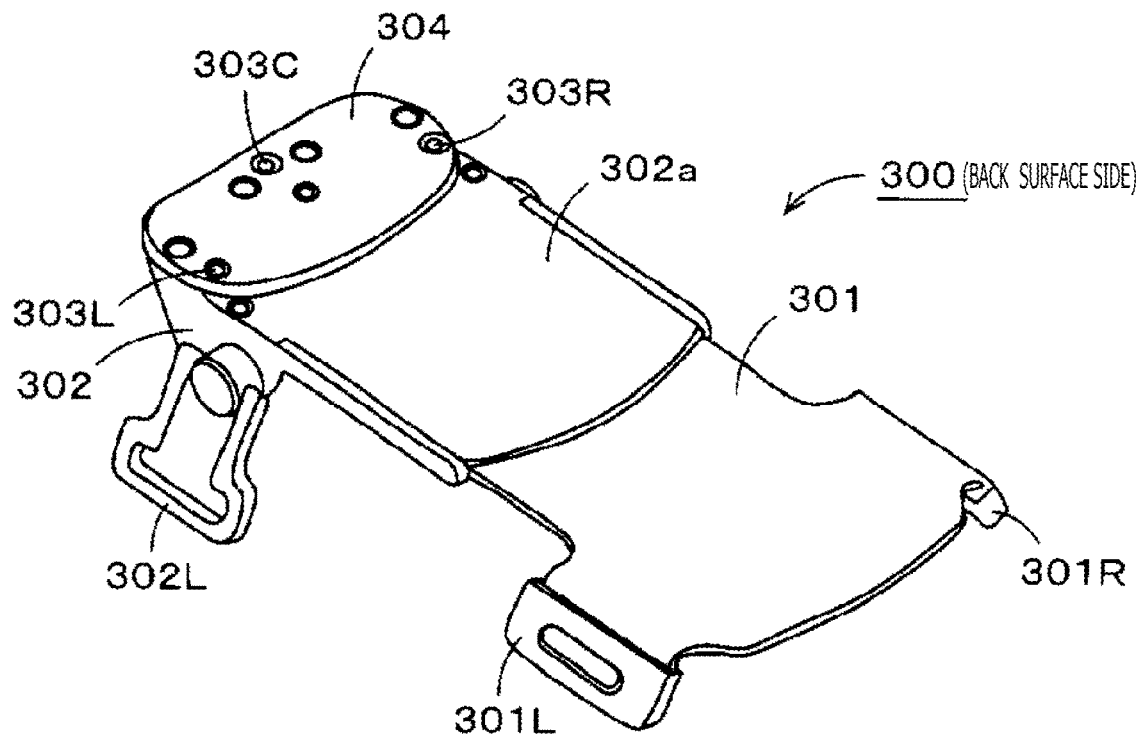

FIGS. 9A and 9B each depict a diagram for explaining a configuration example of the foot-part position indicating instrument 300 of the second embodiment. FIG. 9A is a diagram of the front surface side of the foot-part position indicating instrument 300. FIG. 9B is a diagram of the back surface side of the foot-part position indicating instrument 300. As illustrated in FIG. 9A, the foot-part position indicating instrument 300 includes one plate-shaped sole part 301 opposed to the whole surface of the sole of the foot of the user. The sole part 301 is composed of a sole front part 301f located on the lower side of the toe part of a foot part of the user, a sole back part 301b located on the lower side of the heel part of the foot part of the user, and a sole central part 301c that connects the sole front part 301f and the sole back part 301b. On the sole front part 301f, toe-side belt holding parts 301L and 301R through which a belt for fixing the foot-part position indicating instrument 300 to the foot part of the user is made to pass and which hold the belt are disposed.

A heel-side fixing part 302 is disposed on the side of the sole back part 301b. In FIG. 9A, the heel-side fixing part 302 is illustrated in the state of being separated from the sole part 301, in order to allow viewing of the whole of the configuration on the side of the sole back part 301b. However, in practice, the heel-side fixing part 302 is formed integrally with a bottom surface part 302a that covers the sole back part 301b and the sole central part 301c of the sole part 301 from the lower side thereof as illustrated in FIG. 9B. On the upper side of the bottom surface part 302a of the heel-side fixing part 302, as illustrated in FIG. 9B, the sole back part 301b and the sole central part 301c of the sole part 301 are placed in such a manner as to be opposed to the bottom surface part 302a and are fixed by a sole holding part 302SL and a sole holding part 302SR of the bottom surface part 302a. Needless to say, the bottom surface part 302a of the heel-side fixing part 302 and the sole back part 301b and the sole central part 301c of the sole part 301 may be stuck to each other by an adhesive to be fixed.

Further, on the heel-side fixing part 302, heel-side belt holding parts 302L and 302R through which a belt for fixing the foot-part position indicating instrument 300 to the foot part of the user is made to pass and which hold the belt are disposed as illustrated in FIG. 9A. The toe part of the foot part of the user can be fixed to the sole front part 301f of the sole part 301 by causing the toe part of the foot part of the user to be located between the sole front part 301f and the belt made to pass through the above-described toe-side belt holding parts 301L and 301R. When the heel part of the foot part of the user is put on the sole back part 301b and is fastened by the belt made to pass through the heel-side belt holding parts 302L and 302R in such a manner that the opposite side to the heel part is covered by the belt, the heel side of the foot part of the user can be fixed to the sole back part 301b. This can fix the whole of the foot-part position indicating instrument 300 to the foot part of the user.

Moreover, in the foot-part position indicating instrument 300 of this embodiment, a left position indicating unit 303L is disposed on the left end side of the sole back part 301*b*, and a right position indicating unit 303R is disposed on the right end side of the sole back part 301*b*. In addition, a back position indicating unit 303C is disposed at the center on the back end side of the sole back part 301*b*. The basic configuration of these three position indicating units 303L, 303R, and 303C is similar to that of the position indicating units 101U and 103U described with use of FIGS. 3A to 3C and is composed of a coil for signal transmission, a capacitor, and a pressure sensor. In this embodiment, each of the position indicating units 303L, 303R, and 303C is configured to transmit a signal with a different frequency.

The position indicating units 303L, 303R, and 303C form, in the bottom surface of the sole back part 301*b*, an isosceles triangle in which the left position indicating unit 303L and the right position indicating unit 303R are both ends of the base and the back position indicating unit 303C is the vertex. By the position indicating units 303L, 303R, and 303C disposed in this manner, detection of whether the foot-part position indicating instrument 300 makes forward movement or backward movement is allowed. Regarding the foot-part position indicating instrument 300, the forward movement means movement in the extension direction of a line extended from the heel part toward the toe part, and the backward movement means movement in the extension direction of a line extended from the toe part toward the heel part.

Further, as illustrated in FIG. 9B, a movable range restricting plate 304 is disposed over the back surface of the sole back part 301*b* with the interposition of the bottom surface part 302*a* of the heel-side fixing part 302. The movable range restricting plate 304 engages with a ring-shaped protrusion part that surrounds the outer edge of a movable range restriction region made on an operation surface of the foot-part position detecting device 400 to be described later and acts to restrict the movable range of the foot-part position indicating instrument 300 on the foot-part position detecting device 400. As above, the foot-part position indicating instrument 300 of this embodiment is configured by the sole part 301, the heel-side fixing part 302, the position indicating units 303L, 303R, and 303C, and the movable range restricting plate 304.

Configuration Example of Foot-Part Position Detecting Device 400

Figure 10A:
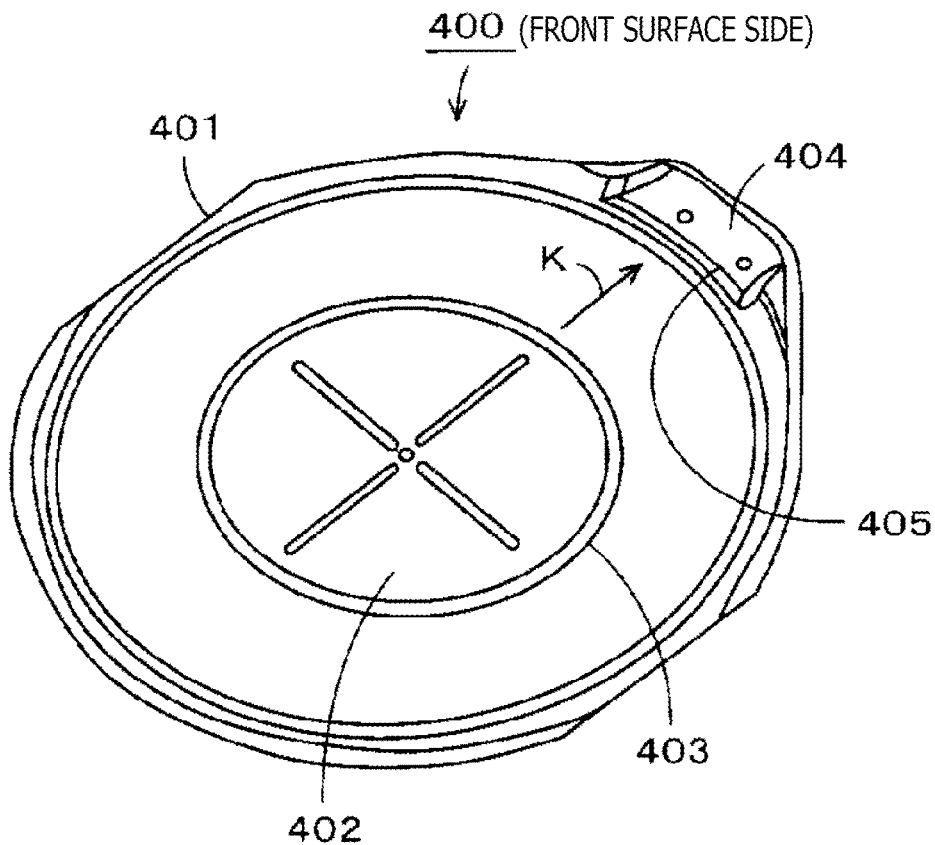
FIGS. 10A and 10B each depict a diagram for explaining a configuration example of a foot-part position detecting device according to the second embodiment of the present disclosure.
Figure 10B:
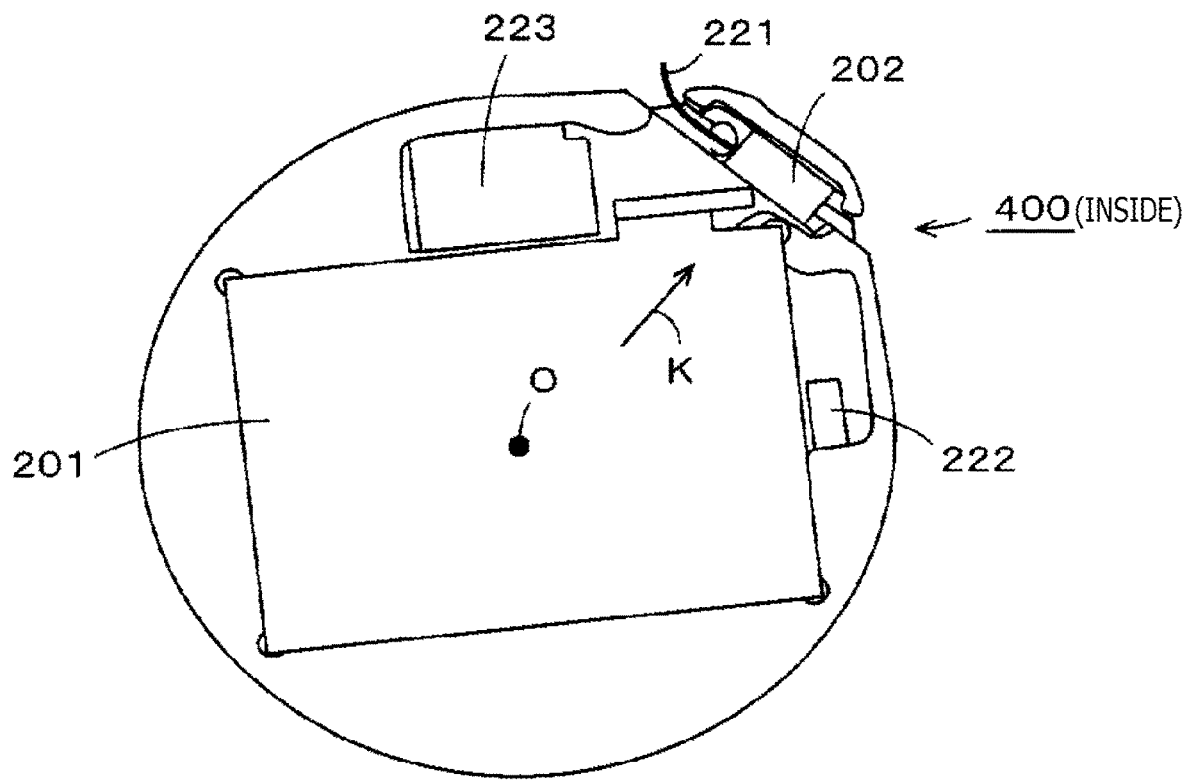

FIGS. 10A and 10B each depict a diagram for explaining a configuration example of the foot-part position detecting device 400 of the second embodiment. In FIGS. 10A and 10B, FIG. 10A is a diagram of the front surface side of the foot-part position detecting device 400 and FIG. 10B is a diagram illustrating the schematic configuration of the inside of the foot-part position detecting device 400. The foot-part position detecting device 400 is configured by disposing an operation surface (top plate) 401 that is circular and has a flat plate shape, on the upper side of the foot-part position detecting device 200 described with use of FIG. 4. The above-described foot-part position indicating instrument 300 is placed on the operation surface 401 and various operations are carried out. At a central part of the operation surface 401, by a ring-shaped protrusion part 403 made into a circumferential shape (ring shape), the inside thereof is caused to be a movable range restriction region 402.

Inside the movable range restriction region 402, the movable range restricting plate 304 of the above-described foot-part position indicating instrument 300 is caused to be located. Due to this, when the foot-part position indicating instrument 300 is greatly moved, the side surface of the movable range restricting plate 304 engages with the ring-shaped protrusion part 403, and further outward movement is restricted. It is also possible for the movable range restricting plate 304 to move on the operation surface 401 beyond the ring-shaped protrusion part 403 if necessary.

As above, the foot-part position indicating instrument 300 is capable of free movement as long as it is on the operation surface 401. However, normally, various kinds of operation input are allowed by free movement of the movable range restricting plate 304 in the movable range restriction region 402 on the operation surface 401. In the movable range restriction region 402, straight line marks are represented in a reference direction K and the direction orthogonal to the reference direction K, and the reference direction and the direction orthogonal thereto are allowed to be recognized visually as well. Further, the intersection of the straight line marks becomes an origin O of a reference coordinate system as described in detail later.

Moreover, a groove part 404 for recognition is made at an outer circumferential part of the operation surface 401 represented by the reference direction K. The sole front part 301*f* of the foot-part position indicating instrument 300 is fitted in the groove part 404 for recognition. This allows the user to recognize the initial position and the initial angle of the foot-part position indicating instrument 300 on the operation surface 401. Specifically, the tip of the sole front part 301*f* abuts against an inner wall part 405 made at an inside opening part of the groove part 404 for recognition. This allows the user to recognize that the foot-part position indicating instrument 300 is located at the inside opening part of the groove part 404 for recognition. That is, the user can recognize that the foot-part position indicating instrument 300 is present at the initial position on the operation surface 401.

If necessary, the sole front part 301*f* of the foot-part position indicating instrument 300 is fitted in such a manner as to ride on the groove part 404 for recognition. This allows the user to grasp the position of the foot-part position indicating instrument 300 on the operation surface 401 more surely due to the fitting of the foot-part position indicating instrument 300 in the groove part 404 for recognition. Thereafter, the foot-part position indicating instrument 300 can be positioned to the initial position on the operation surface 401 by moving the foot-part position indicating instrument 300 backward and causing the tip of the sole front part 301*f* to abut against the inner wall part 405 of the inside opening part of the groove part 404 for recognition.

As described above with use of FIG. 4 and as illustrated in FIG. 10B, the foot-part position detecting device 400 is composed of the position detecting sensor 201 with a rectangular shape and the position detecting circuit 202. In FIG. 10B, as the position detecting circuit 202, the position detecting circuit 202 described with use of FIG. 4 is configured in a casing illustrated as the position detecting circuit 202 in FIG. 10B. In FIG. 10B, a cable 221 drawn out from the position detecting circuit 202 is connected to the I/F 706 of the image processing device 700. In this embodiment, the foot-part position detecting device 400 includes a wireless communication part 222 and a battery 223 as illustrated in FIG. 10B. The wireless communication part 222 is what allows the connection to the image processing device 700 also wirelessly, and the battery 223 is what supplies drive power to the parts of the foot-part position detecting device 400.

In this embodiment, as is understood also from FIG. 10B, the position detecting sensor 201 is disposed with a tilt to the left by 45 degrees with respect to the reference direction K which is the direction in which the groove part 404 for recognition in the operation surface 401 is made. Due to this, at the initial position and angles in the vicinity thereof, frequent riding of two position indicating units over the same position detecting coil is suppressed, and reduction of what is generally called jitter that is fluctuation of the signal waveform in the time-axis direction, for example, are enabled, so that the accuracy of position detection is improved.

Further, in the foot-part position detecting device 400 of this embodiment, the frequency of the signal transmitted from each of the position indicating units 303L, 303R, and 303C disposed in the foot-part position indicating instrument 300 is grasped in a memory disposed in the control circuit 211, for example. This allows the foot-part position detecting device 400 to detect which position indicating unit is indicating which position.

Use Example of Foot-Part Input System

Figure 11A:
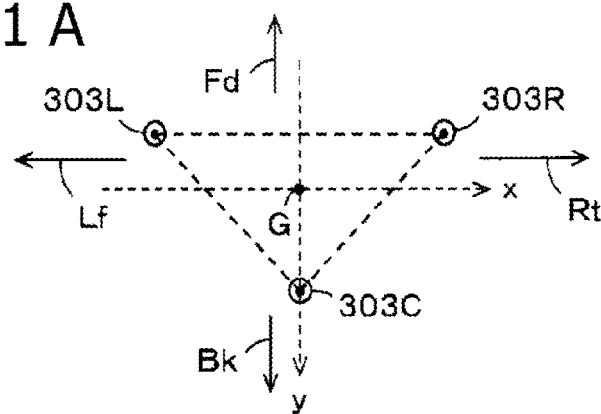
FIGS. 11A to 11C each depict a diagram for explaining a use example of the foot-part input system according to the second embodiment of the present disclosure.
Figure 11B:
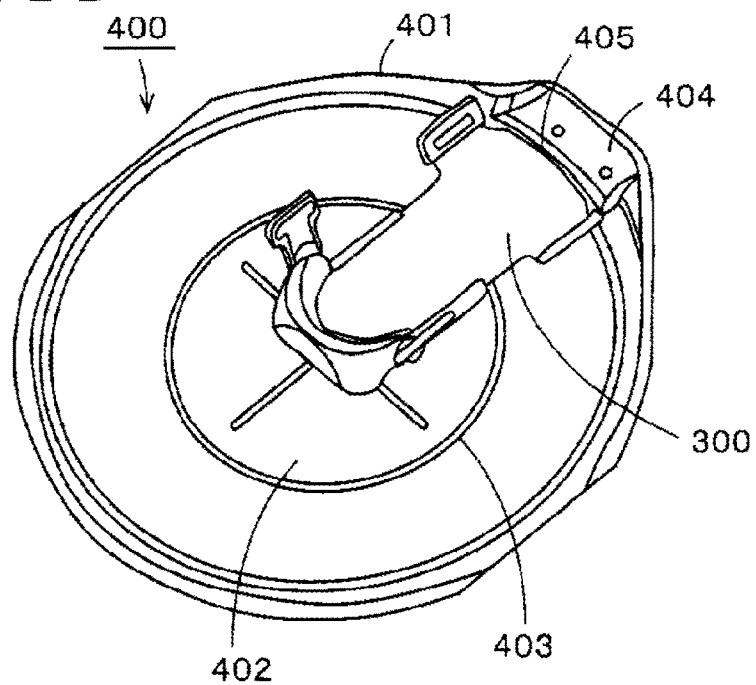
Figure 11C:
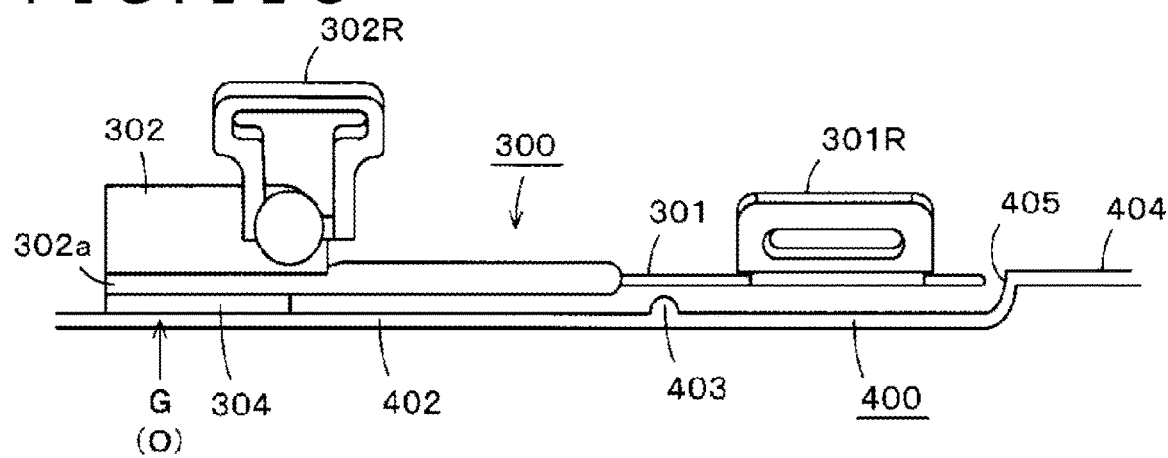

FIGS. 11A to 11C each depict a diagram for explaining a use example of the foot-part input system of the second embodiment. In FIGS. 11A to 11C, FIG. 11A is a diagram for explaining the positional relation among the three position indicating units 303L, 303R, and 303C disposed at the sole back part 301b of the foot-part position indicating instrument 300. Further, FIG. 11B is a diagram illustrating a case in which the foot-part position indicating instrument 300 is placed at the initial position on the operation surface 401 of the foot-part position detecting device 400. Moreover, FIG. 11C is a diagram of a case in which the state illustrated in FIG. 11B is viewed from a side surface side of the foot-part position indicating instrument 300 (lateral direction). In FIG. 11C, only the operation surface 401 of the foot-part position detecting device 400 is illustrated as a circuit and, regarding the foot-part position indicating instrument 300, the whole as viewed from the side surface side thereof is illustrated.

As illustrated in FIG. 9A, on the sole back part 301b of the foot-part position indicating instrument 300 of this embodiment, the left position indicating unit 303L and the right position indicating unit 303R are disposed at positions that are close to the sole central part 301c and are bilaterally symmetric. Moreover, the back position indicating unit 303C is disposed at the center on the back end side of the sole back part 301b. As illustrated in FIG. 11A, these three position indicating units 303L, 303R, and 303C form a triangle in which each of them is a vertex.

In this example, the distance from the left position indicating unit 303L to the back position indicating unit 303C is equal to the distance from the right position indicating unit 303R to the back position indicating unit 303C. Therefore, an isosceles triangle in which the left position indicating unit 303L and the right position indicating unit 303R are both ends of the base and the back position indicating unit 303C is the vertex is formed. In other words, the line segment that links the left position indicating unit 303L and the right position indicating unit 303R is the base, and the line segment that links the back position indicating unit 303C and the left position indicating unit 303L and the line segment that links the back position indicating unit 303C and the right position indicating unit 303R are the legs.

Due to this, as illustrated in FIG. 11A, a position indication coordinate system (transmission coil coordinate system) defined by the three position indicating units 303L, 303R, and 303C is formed. Specifically, a coordinate system in which a straight line that is parallel to the line segment linking the left position indicating unit 303L and the right position indicating unit 303R and that passes through a centroid G is the x-axis and a straight line obtained by drawing a perpendicular line from the back position indicating unit 303C to the x-axis and further extending the perpendicular line from both ends is the y-axis can be formed. This coordinate system is employed as the position indication coordinate system identified by the three position indicating units. The origin of this position indication coordinate system is the centroid G of the isosceles triangle formed by the three position indicating units 303L, 303R, and 303C.

In this embodiment, as the coordinate system to decide the movement direction and the amount of movement regarding the foot-part position indicating instrument 300, this position indication coordinate system defined by the left position indicating unit 303L, the right position indicating unit 303R, and the back position indicating unit 303C is used as one basis. However, this position indication coordinate system is the coordinate system defined by the three position indicating units 303L, 303R, and 303C disposed in the foot-part position indicating instrument 300. Therefore, when the foot-part position indicating instrument 300 moves, this coordinate system also moves.

Thus, another reference coordinate system is set. In this case, as illustrated in FIG. 10A, the center O of the movable range restriction region 402 that is set on the operation surface 401 of the foot-part position detecting device 400 and that has a circular shape is employed as the origin O of the reference coordinate system. A straight line that passes through the origin O and is parallel to the x-axis of the position indication coordinate system is employed as the X-axis of the reference coordinate system. Further, a straight line that passes through the origin O and is parallel to the y-axis of the position indication coordinate system is employed as the Y-axis of the reference coordinate system. Change in the position of the origin (centroid) G of the position indication coordinate system in the reference coordinate system defined in this manner becomes indication input in the foot-part input system.

The reference coordinate system and the position indication coordinate system will be described below. First, in FIG. 11A, a point inside the isosceles triangle formed by the three position indicating units 303L, 303R, and 303C represents the centroid G of the isosceles triangle. Suppose that the foot-part position indicating instrument 300 is placed on the operation surface 401 of the foot-part position detecting device 400. In this case, the position on the position detecting sensor 201 corresponding to the centroid G of the isosceles triangle formed by the position indicating units 303L, 303R, and 303C is detected as the indicated position of the foot-part position indicating instrument 300 in the foot-part position detecting device 400.

First, a case in which the foot-part position indicating instrument 300 is placed on the operation surface 401 of the foot-part position detecting device 400 as illustrated in FIG. 11B will be considered. When the state illustrated in FIG. 11B is viewed from just beside the foot-part position indicating instrument 300, the state illustrated in FIG. 11C is obtained. As is understood from FIGS. 11B and 11C, in the case of this example, the movable range restricting plate 304 disposed on the lower side of the sole back part 301b of the foot-part position indicating instrument 300 is located in the movable range restriction region 402 on the operation surface 401 of the foot-part position detecting device 400. Simultaneously, the tip of the sole front part 301f of the foot-part position indicating instrument 300 is opposed to the inner wall part 405 disposed at the inside opening part of the groove part 404 for recognition in the foot-part position detecting device 400, and abuts against the inner wall part 405 or is in the state of being allowed to immediately abut against it.

The state illustrated in FIGS. 11B and 11C corresponds to the initial position of the foot-part position indicating instrument 300 placed on the operation surface 401 of the foot-part position detecting device 400. In this case, the centroid G of the isosceles triangle formed by the left position indicating unit 303L, the right position indicating unit 303R, and the back position indicating unit 303C disposed at the sole back part 301b of the foot-part position indicating instrument 300 corresponds with the center of the movable range restriction region 402 on the operation surface 401. The center of this movable range restriction region becomes the origin O of the reference coordinate system. In practice, it is rare that the centroid (origin) G of the isosceles triangle (position indication coordinate system) completely corresponds with the origin O of the reference coordinate system. Therefore, the foot-part position indicating instrument 300 is allowed to be regarded as being present at the initial position on the foot-part position detecting device 400 when the centroid G is located in a predetermined range centered at the origin O.

As above, the origin of the reference coordinate system is the center of the movable range restriction region. However, the orientations of the X-axis and the Y-axis of the reference coordinate system depend on the x-axis and the y-axis of the position indication coordinate system settled according to the orientation of the foot-part position indicating instrument 300. In other words, the orientation of the position indication coordinate system depends on the orientation of the isosceles triangle formed by the left position indicating unit 303L, the right position indicating unit 303R, and the back position indicating unit 303C disposed in the foot-part position indicating instrument 300.

Thus, whichever orientation the foot-part position indicating instrument 300 placed on the operation surface 401 of the foot-part position detecting device 400 is placed in, movement of the indicated position (centroid G) can be sensed as change in the Y-axis direction of the reference coordinate system, when the foot-part position indicating instrument 300 is moved in the longitudinal direction. Further, whichever orientation the foot-part position indicating instrument 300 placed on the operation surface 401 of the foot-part position detecting device 400 is placed in, movement of the indicated position (centroid G) can be sensed as change in the X-axis direction of the reference coordinate system, when the foot-part position indicating instrument 300 is moved in the direction orthogonal to the longitudinal direction.

Description will be made more specifically. FIGS. 11B and 11C illustrate a case in which the foot-part position indicating instrument 300 is present at the initial position on the operation surface 401 of the foot-part position detecting device 400. In this embodiment, the foot-part position indicating instrument 300 can rotate by 360 degrees around the centroid G of the isosceles triangle formed by the three position indicating units 303L, 303R, and 303C at the sole back part 301b on the operation surface 401 which is a circular flat surface. Further, the foot-part position indicating instrument 300 can move in both the forward-backward direction and the left-right direction when the movable range restricting plate 304 of the foot-part position indicating instrument 300 is present in the movable range restriction region 402 of the operation surface 401.

The reference coordinate system in this case corresponds with the position indication coordinate system defined by the three position indicating units 303L, 303R, and 303C at the sole back part 301b as described above with use of FIG. 11A. Therefore, whichever direction the foot-part position indicating instrument 300 is oriented in, the value of the Y-axis of the reference coordinate system becomes larger when the foot-part position indicating instrument 300 is moved forward. Further, the value of the Y-axis of the reference coordinate system becomes smaller when the foot-part position indicating instrument 300 is moved backward. Similarly, the value of the X-axis of the reference coordinate system becomes larger when the foot-part position indicating instrument 300 is moved rightward. In addition, the value of the X-axis of the reference coordinate system becomes smaller when the foot-part position indicating instrument 300 is moved leftward.

As illustrated in FIGS. 9A and 9B, in this embodiment, the left position indicating unit 303L and the right position indicating unit 303R are disposed at bilaterally symmetrical positions and closer to the sole central part 301c. Further, the back position indicating unit 303C is disposed on the back end side of the sole back part 301b. Thus, the movement direction can be identified according to whether the back position indicating unit 303C is moving to follow the left position indicating unit 303L and the right position indicating unit 303R or the left position indicating unit 303L and the right position indicating unit 303R are moving to follow the back position indicating unit 303C.

Specifically, suppose that the back position indicating unit 303C is moving to follow the left position indicating unit 303L and the right position indicating unit 303R. The following in this case means that the back position indicating unit 303C moves to the front side on which the left position indicating unit 303L and the right position indicating unit 303R have been located, in association with the movement of the left position indicating unit 303L and the right position indicating unit 303R. In this case, it is possible to sense that the foot-part position indicating instrument 300 is moving in the forward direction that is the extension direction of a line extended from the heel part toward the toe part as illustrated by an arrow Fd in FIG. 11A. Further, the distance from the position on the position detecting sensor 201 at which the centroid G before the movement is located to the position on the position detecting sensor 201 at which the centroid G after the movement is located is equivalent to the amount of movement in the forward direction, i.e., the amount of movement in the direction in which the value increases on the y-axis.

If the amount of movement is deemed as the amount of movement per unit time in the image processing device 700, the amount of movement can be regarded as the speed from "speed=distance/time." Therefore, forward movement is made at a higher speed when the amount of movement is larger. This is also what is generally called joystick-like operation. For example, assuming that the centroid G moves by 10 cm in one second when the unit time is one second, it is deemed that the movement is made at a movement speed of 10 cm per one second, that is, the movement speed is 10 cm/seconds, and this movement speed can be used for processing.

Conversely, suppose that the left position indicating unit 303L and the right position indicating unit 303R are moving to follow the back position indicating unit 303C. The following in this case means that the left position indicating unit 303L and the right position indicating unit 303R move to the back side on which the back position indicating unit 303C has been located, in association with the movement of the back position indicating unit 303C. In this case, it is possible to sense that the foot-part position indicating instrument 300 is moving in the backward direction that is the extension direction of a line extended from the toe part toward the heel part as illustrated by an arrow Bk in FIG. 11A. Further, the distance from the position on the position detecting sensor 201 at which the centroid G before the movement is located to the position on the position detecting sensor 201 at which the centroid G after the movement is located is equivalent to the amount of movement in the backward direction, i.e., the amount of movement in the direction in which the value decreases on the y-axis. In addition, it is also possible to think of the amount of movement of the centroid G in the backward direction as the movement speed in the backward direction (negative direction on the y-axis) per unit time and use the amount of movement as the movement speed similarly to the case of the movement in the forward direction.

Moreover, suppose that the right position indicating unit 303R is moving to follow the left position indicating unit 303L. The following in this case means that the right position indicating unit 303R moves in the left direction in which the left position indicating unit 303L has been located, in association with the movement of the left position indicating unit 303L. In this case, it is possible to sense that the foot-part position indicating instrument 300 is moving in the left direction that is a direction intersecting a line extended from the heel part toward the toe part as illustrated by an arrow Lf in FIG. 11A. Further, the distance from the position on the position detecting sensor 201 at which the centroid G before the movement is located to the position on the position detecting sensor 201 at which the centroid G after the movement is located is equivalent to the amount of movement in the left direction, i.e., the amount of movement in the direction in which the value decreases on the x-axis. In addition, it is also possible to think of the amount of movement of the centroid G in the left direction as the movement speed in the left direction (negative direction on the x-axis) per unit time and use the amount of movement as the movement speed similarly to the case of the movement in the forward direction.

Conversely, suppose that the left position indicating unit 303L is moving to follow the right position indicating unit 303R. The following in this case means that the left position indicating unit 303L moves in the right direction in which the right position indicating unit 303R has been located, in association with the movement of the right position indicating unit 303R. In this case, it is possible to sense that the foot-part position indicating instrument 300 is moving in the right direction that is a direction intersecting a line extended from the heel part toward the toe part as illustrated by an arrow Rt in FIG. 11A. Further, the distance from the position on the position detecting sensor 201 at which the centroid G before the movement is located to the position on the position detecting sensor 201 at which the centroid G after the movement is located is equivalent to the amount of movement in the right direction, i.e., the amount of movement in the direction in which the value increases on the x-axis. In addition, it is also possible to think of the amount of movement of the centroid G in the right direction as the movement speed in the right direction (positive direction on the x-axis) per unit time and use the amount of movement as the movement speed similarly to the case of the movement in the forward direction.

As above, in the foot-part position detecting device 400 of this embodiment, first, the position indication coordinate system is identified from the positions of the three position indicating units 303L, 303R, and 303C. Next, the center of the movable range restriction region 402 of the operation surface 401 is deemed as the origin O of the reference coordinate system, and the X-axis and the Y-axis of the reference coordinate system are identified based on the x-axis and the y-axis of the position indication coordinate system. In the reference coordinate system identified in this manner, how far and in which direction of the forward direction Fd, the backward direction Bk, the left direction Lf, and the right Rt the foot-part position indicating instrument 300 moves is sensed. The amount of movement in this case is obtained based on how far the centroid G set on the sole back part 301b is separate from the origin O of the reference coordinate system. The movement direction and the amount of movement regarding the foot-part position indicating instrument 300 detected in this manner are sent to the image processing device 700. In another example, it is also possible to interpret (regard) the amount of movement per unit time in each movement direction obtained in the above-described manner as the movement speed per unit time and provide the movement speed to the image processing device 700 to use it.

Indication Input through Foot-Part Input System

FIGS. 12A to 12C, FIGS. 13A to 13C, and FIGS. 14A to 14C are diagrams for explaining the operation state of the foot-part input system of the second embodiment and the display image of the head-mounted display. As described above, in the foot-part input system of this embodiment, when the foot-part position indicating instrument 300 is moved forward, backward, leftward, and rightward on the operation surface 401 of the foot-part position detecting device 400, the movement direction and the amount of movement are supplied to the image processing device 700. Thus, in the image processing device 700, a three-dimensional space image displayed on the display of the HMD 500 can be changed according to the movement direction and the amount of movement from the foot-part position detecting device 400.

In the second embodiment, the amount of movement of the centroid G from the origin O is deemed as the amount of movement per unit time, and the movement speed per unit time identified from this amount of movement per unit time is reflected in the system. To put it simply, the amount of movement (distance) of displacement from the origin is thought of as the movement speed per unit time. Therefore, when the centroid G of the foot-part position indicating instrument 300 is displaced forward by r (+r), the image can be changed in such a manner that forward movement is made at the speed at which the movement is made by the distance r per unit time. Further, when the centroid G is displaced forward by 2r (+2r), the image can be changed in such a manner that forward movement is made at the speed at which the movement is made by the distance 2r per unit time. Moreover, when the centroid G of the foot-part position indicating instrument 300 is returned to the origin O, the movement distance becomes zero and the change in the image stops.

Similarly, when the centroid G of the foot-part position indicating instrument 300 is displaced backward by r (−r), the image can be changed in such a manner that backward movement is made at the speed at which the movement is made by the distance r per unit time. Further, when the centroid G of the foot-part position indicating instrument 300 is displaced to the right by 1 (+1 (ell)), the image can be changed with the speed at which movement is made to the right by the distance l per unit time. Moreover, when the centroid G of the foot-part position indicating instrument 300 is displaced to the left by 1 (−1), the image can be changed with the speed at which movement is made to the left by the distance 1 per unit time. In this manner, the direction and the speed of changing the image can be varied according to the displacement of the centroid G from the origin O.

Suppose that, as illustrated in FIGS. 12A to 12C, the foot-part position indicating instrument 300 is placed on the operation surface 401 of the foot-part position detecting device 400 and the movable range restricting plate 304 that is present on the back surface of the sole back part 301*b* of the foot-part position indicating instrument 300 is present in the movable range restriction region 402 on the operation surface 401. Therefore, in all of FIGS. 12A, 12B, and 12C, the left position indicating unit 303L, the right position indicating unit 303R, and the back position indicating unit 303C disposed in the foot-part position indicating instrument 300 are located in the movable range restriction region 402.

FIG. 12B illustrates the case in which the foot-part position indicating instrument 300 is present at the initial position (home position) on the operation surface 401. Therefore, FIG. 12B illustrates a case in which the centroid G of the isosceles triangle formed by the three position indicating units 303L, 303R, and 303C disposed at the sole back part 301*b* of the foot-part position indicating instrument 300 substantially corresponds with the center (origin) O of the movable range restriction region 402. Suppose that, in this state, a three-dimensional space image including a tree and a cloud as the subject is displayed on the display HDP of the HMD 500 mounted on the head of the user, as illustrated in FIG. 12B.

Suppose that, from the state illustrated in FIG. 12B, the foot-part position indicating instrument 300 is moved forward in the state of being kept contact with the operation surface 401 as illustrated in FIG. 12C. In this case, the movement direction and the amount of movement based on the centroid G are detected in the position detecting circuit 202 of the foot-part position detecting device 400, and they are supplied to the image processing device 700. The movement direction in this case is the forward direction (extension direction of the line extended from the heel toward the toe), and the amount of movement is the distance from the origin O to the centroid G in the positive direction of the Y-axis of the reference coordinate system. Further, as described above, the movement speed per unit time can be grasped from the amount of movement per unit time. Thus, the forward movement is made at the movement speed according to this amount of movement per unit time.

In this case, the image processing circuit 703 of the image processing device 700 determines that the forward movement of the foot-part position indicating instrument 300 is indication input of enlargement of the three-dimensional space image, and performs processing to display the three-dimensional space image on the display HDP in such a manner as to continue to enlarge the three-dimensional space image according to the amount of movement or the movement speed. The enlargement of the three-dimensional space image means that, due to gradual forward movement of the point of view, the subject gradually comes closer and comes to look large and change to a more detailed three-dimensional space image is caused. That is, in the enlargement of the image, display processing is executed to provide the following display process, for example. Specifically, a wood seen in the distance gradually comes closer due to the forward movement and trees come to look large. Then, if the forward movement is further continued, the point of view enters the wood and details in the wood become visible.

Suppose that, from the state illustrated in FIG. 12B, the foot-part position indicating instrument 300 is moved backward in the state of being kept contact with the operation surface 401 as illustrated in FIG. 12A. In this case, the movement direction and the amount of movement based on the centroid G are detected in the position detecting circuit 202 of the foot-part position detecting device 400, and they are supplied to the image processing device 700. The movement direction in this case is the backward direction (extension direction of the line extended from the toe toward the heel), and the amount of movement is the distance from the origin O to the centroid G in the negative direction of the Y-axis of the reference coordinate system. Also in this case, the movement speed per unit time can be grasped from the amount of movement per unit time. Thus, the backward movement is made at the movement speed according to this amount of movement per unit time.

In this case, the image processing circuit 703 of the image processing device 700 determines that the backward movement of the foot-part position indicating instrument 300 is indication input of reduction of the three-dimensional space image, and performs processing to display the three-dimensional space image on the display HDP in such a manner as to continue to reduce the three-dimensional space image according to the amount of movement or the movement speed. The reduction of the three-dimensional space image means that, conversely to the case of the enlargement, due to gradual backward movement of the point of view, the subject gradually gets farther away and comes to look small and further becomes gradually unidentifiable. That is, in the reduction of the image, display processing is executed to provide the following display process, for example. Specifically, from the state in which the details in the wood are visible, the point of view gets out of the wood and gradually gets farther away from the wood, and woods that looked large thus far come to look small. Finally, the wood and the trees that configure the wood become invisible.

Figure 13C:
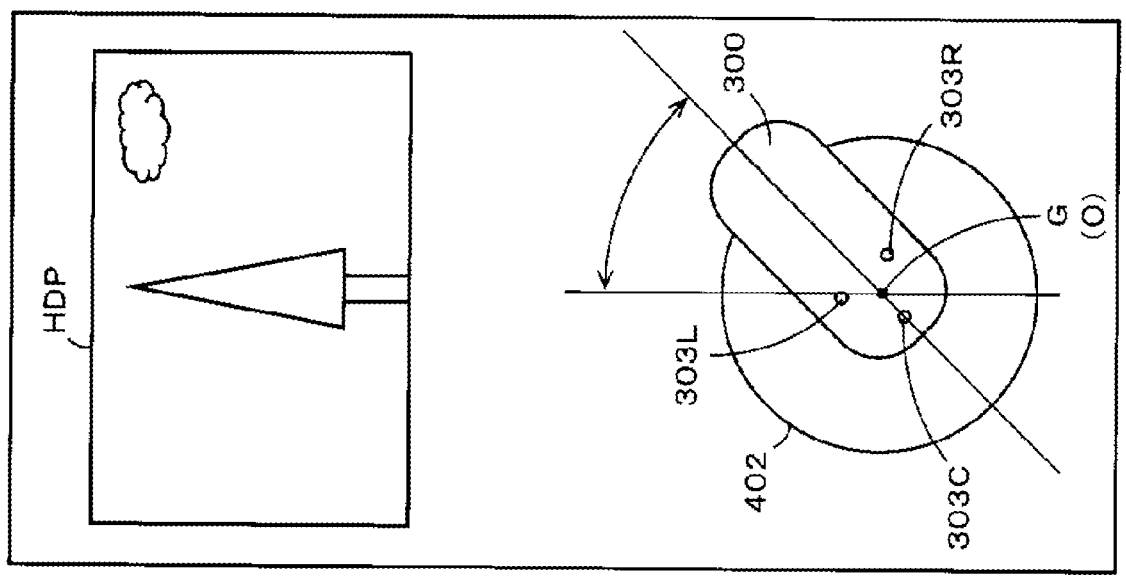
FIGS. 13A to 13C each depict a diagram for explaining the operation state of the foot-part input system according to the second embodiment of the present disclosure and the display image of the head-mounted display.
Figure 13B:
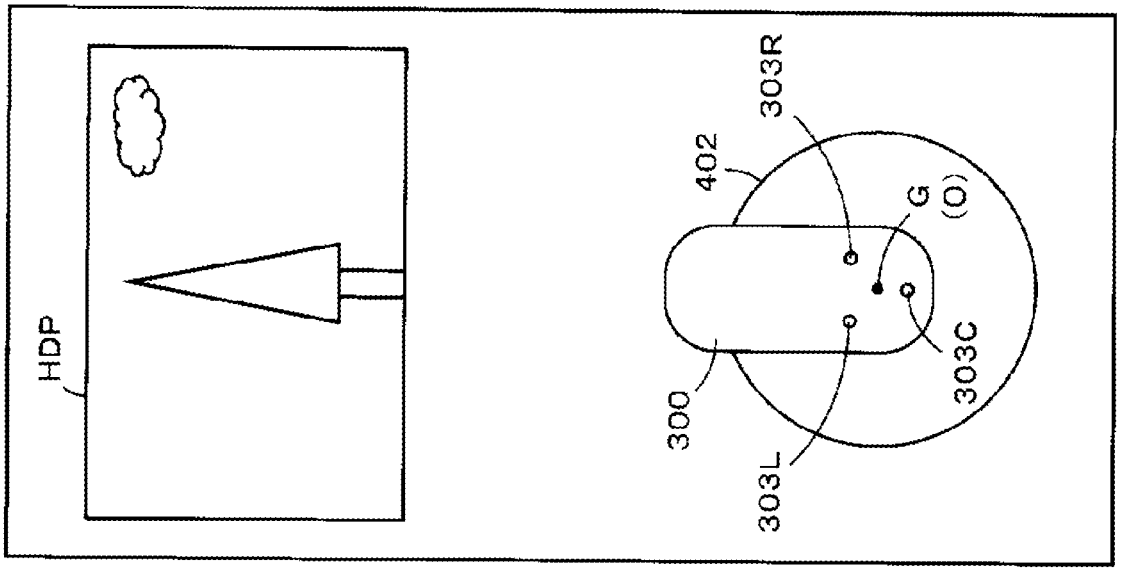
Figure 13A:
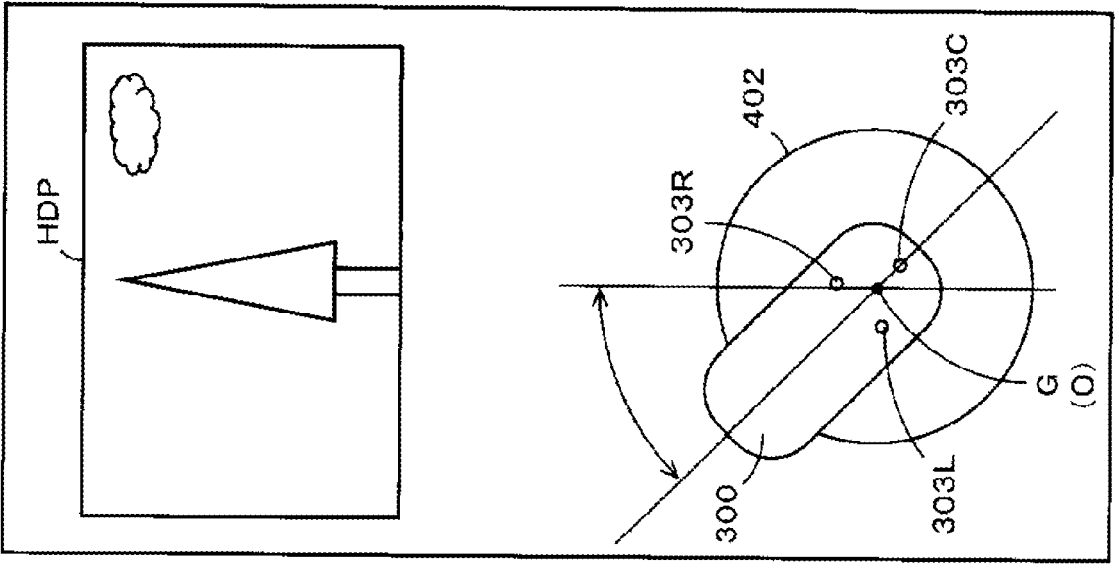

When the foot-part position indicating instrument 300 makes neither forward movement nor backward movement on the operation surface 401, the movement direction and the amount of movement are not detected in the foot-part position detecting device 400 and are not supplied to the image processing device 700. Thus, as illustrated in FIGS. 13A to 13C, when the toe side of the foot-part position indicating instrument 300 is rotated, the three-dimensional space image displayed on the display HDP does not change. That is, the three-dimensional space image displayed on the display HDP does not change when the foot-part position indicating instrument 300 is rotated in a counterclockwise manner (FIG. 13A) or is rotated in a clockwise manner (FIG. 13C) from the state in which the foot-part position indicating instrument 300 is present at the initial position (home position) (FIG. 13B).

Figure 14C:
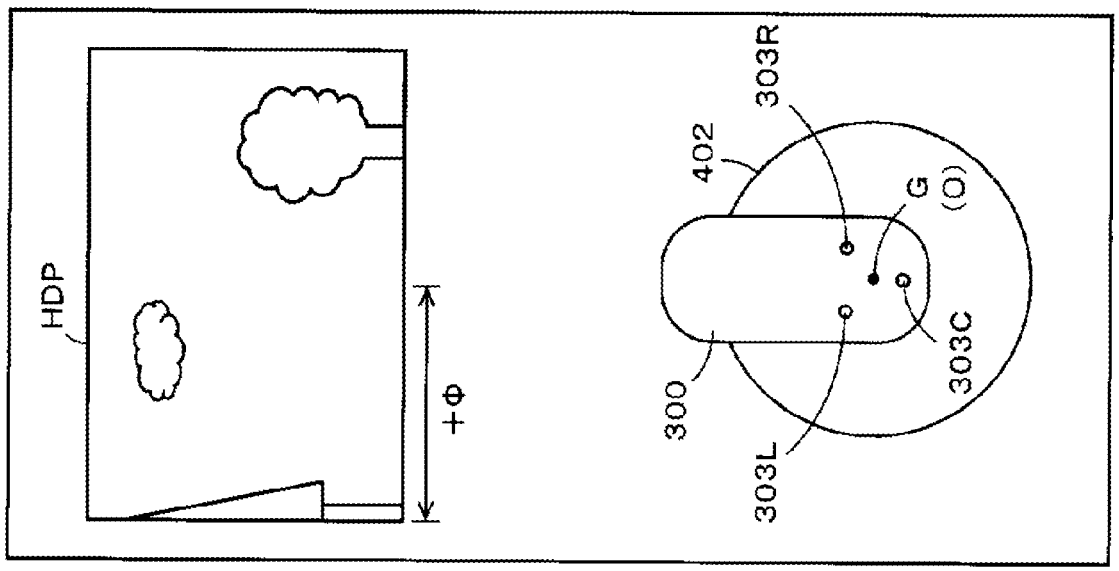
FIGS. 14A to 14C each depict a diagram for explaining the operation state of the foot-part input system according to the second embodiment of the present disclosure and the display image of the head-mounted display.
Figure 14B:
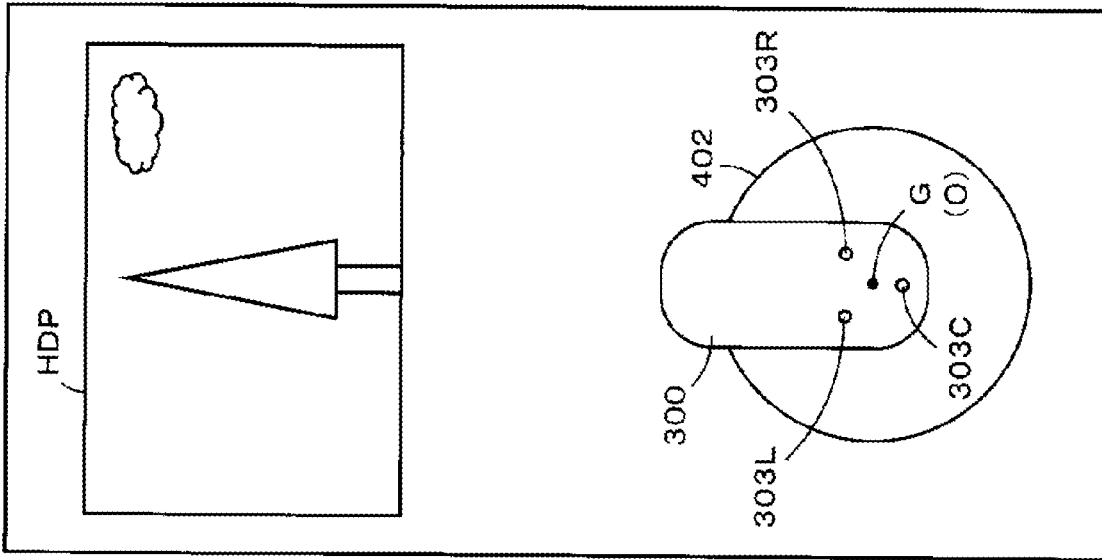
Figure 14A:
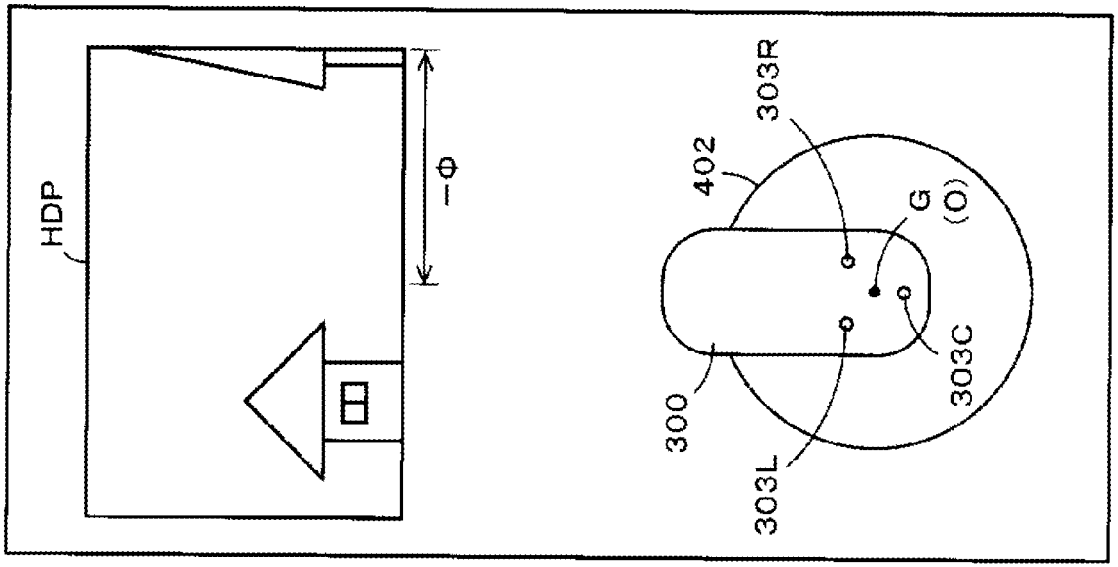

However, even when the foot-part position indicating instrument 300 makes neither forward movement nor backward movement on the operation surface 401, the three-dimensional space image on the display HDP changes when the HMD 500 mounted on the head of the user rotates in association with rotation of the head. Specifically, as illustrated in FIGS. 14A to 14C, even when the foot-part position indicating instrument 300 does not move at all, the three-dimensional space image displayed on the display HDP changes when the HMD 500 rotates. In all of FIGS. 14A, 14B, and 14C, the foot-part position indicating instrument 300 is present at the initial position (home position).

When the user rotates the head in a counterclockwise manner by φ degrees (−φ) in this state, the rotation direction and the rotation angle are supplied from the HMD 500 to the image processing device 700. In response to this, as illustrated in FIG. 14A, the image processing circuit 703 forms the three-dimensional space image resulting from the rotation in the counterclockwise manner by φ degrees and displays it on the display HDP. Conversely, when the user rotates the head in a clockwise manner by φ degrees (+φ), the rotation direction and the rotation angle are supplied from the HMD 500 to the image processing device 700. In response to this, as illustrated in FIG. 14C, the image processing circuit 703 forms the three-dimensional space image resulting from the rotation in the clockwise manner by φ degrees and displays it on the display HDP.

Suppose that, in the foot-part input system of this embodiment, the foot-part position indicating instrument 300 is placed on the operation surface 401 of the foot-part position detecting device 400 and leftward movement or rightward movement is carried out with the placed state kept. In this case, the movement direction and the amount of movement are supplied to the image processing device 700. Due to this, the position of the point of view can be shifted in the left direction or the right direction in the three-dimensional space image that the display HDP of the HMD 500 is caused to display. In this case, shifting the three-dimensional space image in the left direction or the right direction means not shifting the viewing direction as in rotation of the HMD 500 but shifting the position of the point of view of the user in the three-dimensional space image in the left direction or the right direction.

For example, suppose that the foot-part position indicating instrument 300 is moved to the left on the operation surface 401. In this case, the image processing circuit 703 of the image processing device 700 forms the three-dimensional space image seen when the position of the point of view of the user in the three-dimensional space image is moved in the left direction and displays it on the display HDP. Suppose that the foot-part position indicating instrument 300 is moved to the right on the operation surface 401 similarly. In this case, the image processing circuit 703 of the image processing device 700 forms the three-dimensional space image seen when the position of the point of view of the user in the three-dimensional space image is moved in the right direction and displays it on the display HDP.

Figure 15:
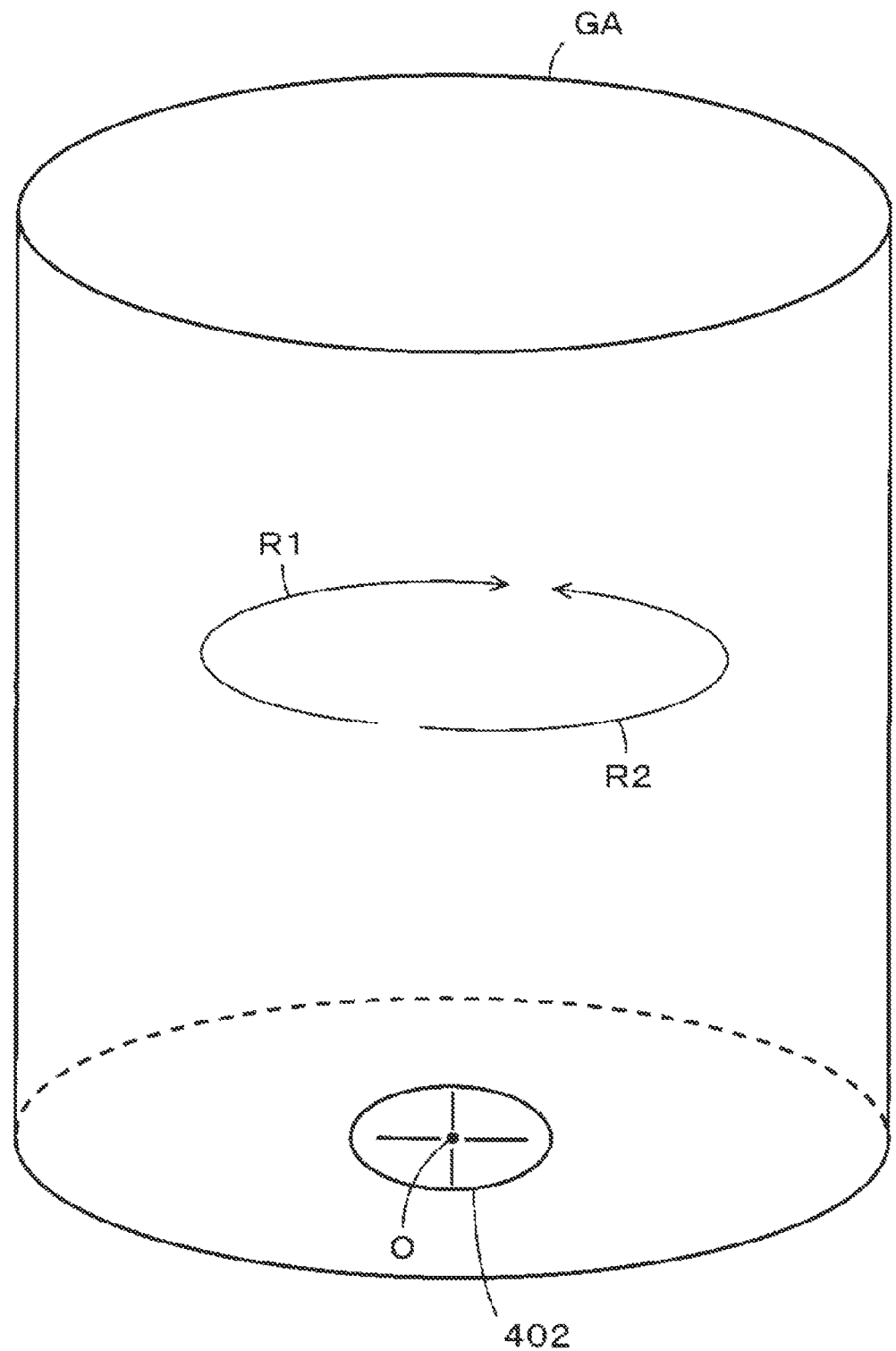
FIG. 15 is a diagram for explaining indication input in the image processing system configured with use of the foot-part input system according to the second embodiment of the present disclosure.
Figure 16:
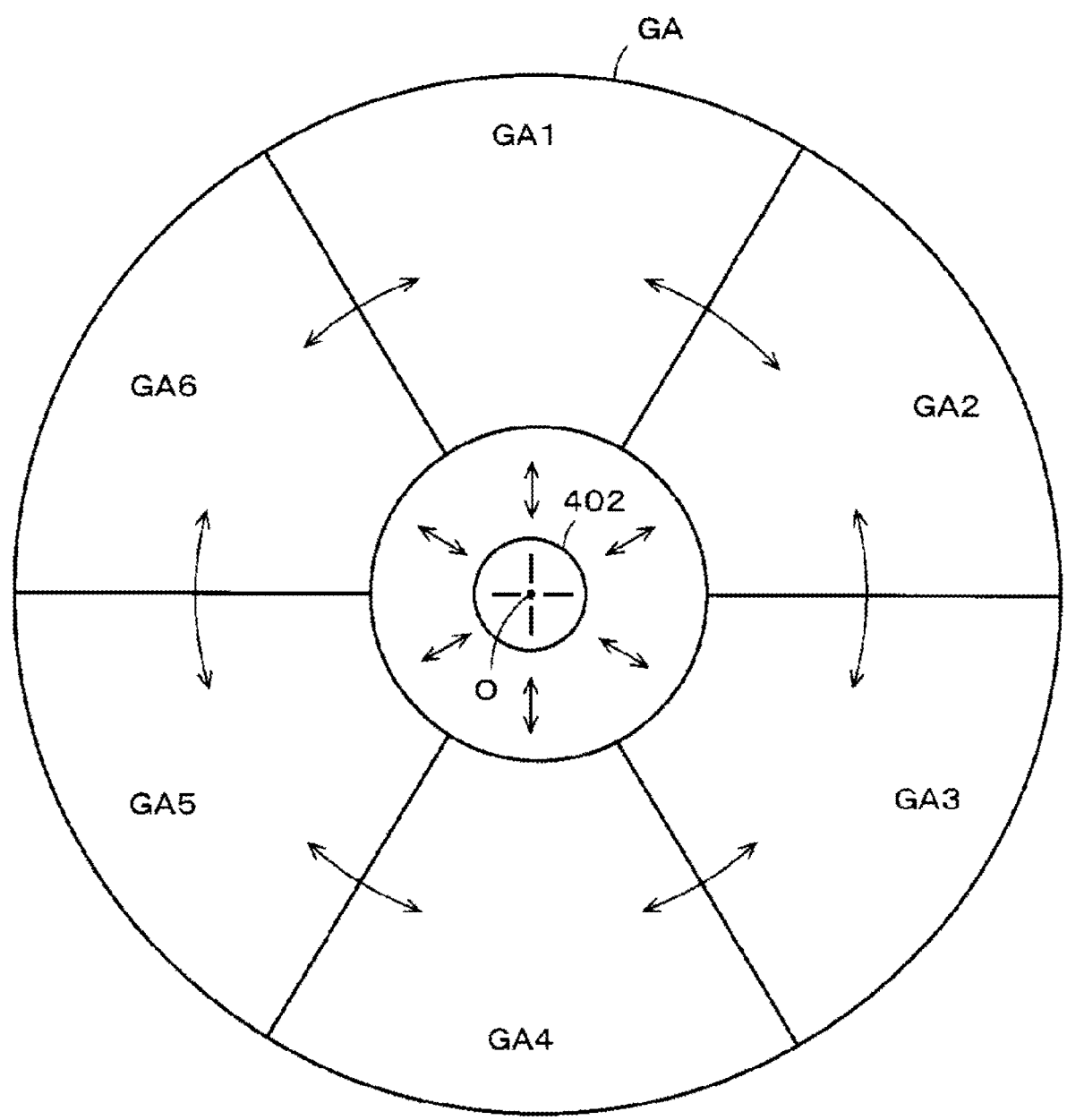
FIG. 16 is a diagram for explaining the indication input in the image processing system configured with use of the foot-part input system according to the second embodiment of the present disclosure.

FIG. 15 and FIG. 16 are diagrams for explaining indication input in the image processing system configured with use of the foot-part input system of the second embodiment. As illustrated also in FIG. 8, the image processing device 700 is what can form the three-dimensional space image in the 360-degree image region GA as illustrated in FIG. 15. That is, the image processing device 700 can form an image with width, height, and depth (three-dimensional space image) across the circumference of 360 degrees and display it on the display HDP of the HMD 500.

In this case, as illustrated by arrows R1 and R2 in FIG. 15, the orientation in the 360-degree image region GA can be changed according to the orientation of the HMD 500. Further, as illustrated by double arrows around the movable range restriction region 402 illustrated in the bottom surface in FIG. 15, enlargement and reduction of the three-dimensional space image displayed on the display HDP of the HMD 500 can be carried out by forward movement and backward movement of the foot-part position indicating instrument 300.

For example, a consideration will be made about a case in which, as illustrated in FIG. 16, the 360-degree image region GA is divided into, for example, six regions GA1, GA2, GA3, GA4, GA5, and GA6. In this case, which region is employed as the region whose three-dimensional space image is displayed on the display HDP of the HMD 500 can be switched according to the orientation of the HMD 500 as illustrated by arrows on the respective regions. Further, enlargement and reduction of the three-dimensional space image in the displayed region can be carried out by forward movement and backward movement of the foot-part position indicating instrument 300 placed on the operation surface 401 of the foot-part position detecting device 400 as illustrated by double arrows around the movable range restriction region 402 of the foot-part position detecting device 400.

Although diagrammatic representation is not made in FIG. 15 and FIG. 16, the three-dimensional space image formed when the position of the point of view in the three-dimensional space image is moved to the left or right can be formed through leftward movement or rightward movement of the foot-part position indicating instrument 300 placed on the operation surface 401 of the foot-part position detecting device 400. This three-dimensional space image is formed by the image processing circuit 703 of the image processing device 700, is supplied to the HMD 500, and can be caused to be displayed on the display HDP.

Figure 17A:
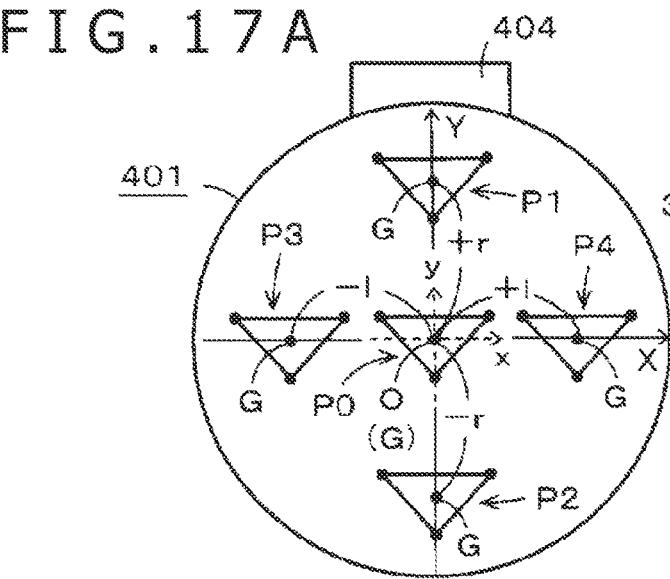
FIGS. 17A to 17E each depict a diagram for explaining how to detect the indication input in the foot-part input system according to the second embodiment of the present disclosure.
Figure 17B:
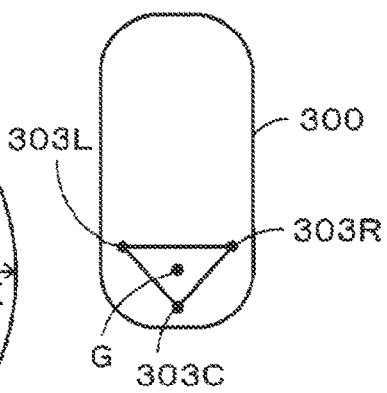
Figure 17C:
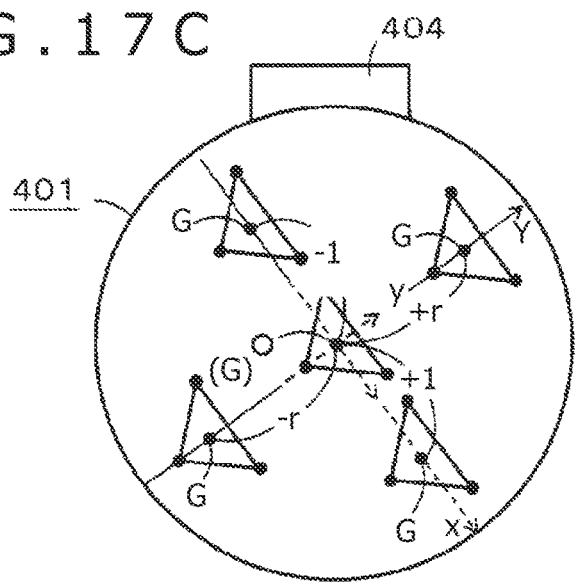
Figure 17D:
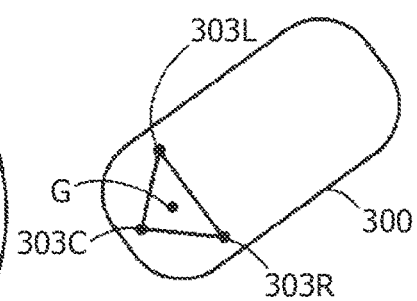
Figure 17E:
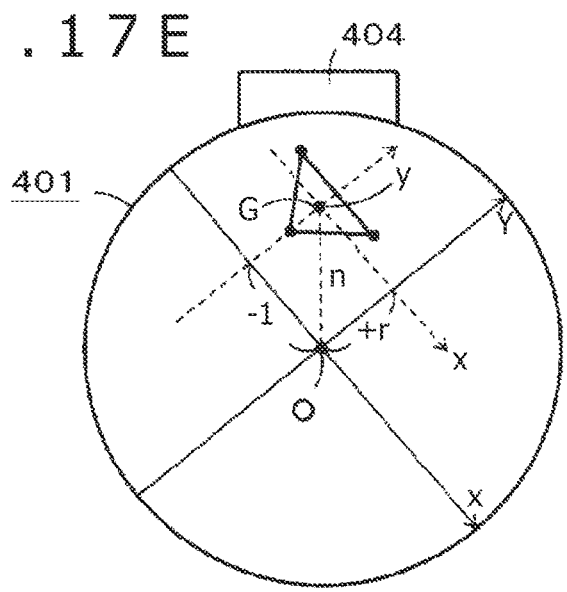

FIGS. 17A to 17E is a diagram for explaining how to detect the indication input in the foot-part input system of the second embodiment. FIGS. 17A, 17C, and 17E illustrate the operation surface 401 of the foot-part position detecting device 400 and the states of movement of the position indicating units 303L, 303R, and 303C of the foot-part position indicating instrument 300 subjected to movement operation on the operation surface 401. Further, FIG. 17B illustrates the orientation of the foot-part position indicating instrument 300 located on the operation surface 401 in FIG. 17A. FIG. 17D illustrates the orientation of the foot-part position indicating instrument 300 located on the operation surface 401 in FIGS. 17C and 17E.

As described above, in the second embodiment, the reference coordinate system defined on the operation surface 401 of the foot-part position detecting device 400 includes the center of the operation surface 401 as the origin O. Further, the orientation of the X-axis and the Y-axis of the reference coordinate system is settled based on the x-axis and the y-axis of the position indication coordinate system dependent on the three position indicating units 303L, 303R, and 303C of the foot-part position indicating instrument 300. Thus, when the foot-part position indicating instrument 300 is placed on the operation surface 401 in the form illustrated in FIG. 17B, the isosceles triangle formed by the position indicating units 303L, 303R, and 303C is located at a position P0 in FIG. 17A.

Therefore, the reference coordinate system (origin O, X-axis, Y-axis) corresponds with the position indication coordinate system (origin G, x-axis, y-axis). Suppose that, in this case, the foot-part position indicating instrument 300 is moved forward to move the isosceles triangle formed by the position indicating units 303L, 303R, and 303C to a position P1. Because the movement is the forward movement, it is interpreted that the movement is being made at a speed at which the movement is made by a movement distance +r per unit time, and the three-dimensional space image is continued to be enlarged. Further, suppose that the foot-part position indicating instrument 300 is moved backward to move the isosceles triangle formed by the position indicating units 303L, 303R, and 303C to a position P2. In this case, because the movement is the backward movement, it is interpreted that the movement is being made at a speed at which the movement is made by a movement distance −r per unit time, and the three-dimensional space image is continued to be reduced.

Moreover, suppose that the foot-part position indicating instrument 300 is moved to the left to move the isosceles triangle formed by the position indicating units 303L, 303R, and 303C to a position P3. In this case, because the movement is the leftward movement, it is interpreted that the movement is being made at a speed at which the movement is made by a movement distance −l per unit time, and the point of view is continued to be moved to the left side in the three-dimensional space. In addition, suppose that the foot-part position indicating instrument 300 is moved to the right to move the isosceles triangle formed by the position indicating units 303L, 303R, and 303C to a position P4. In this case, because the movement is the rightward movement, it is interpreted that the movement is being made at a speed at which the movement is made by a movement distance +l per unit time, and the point of view is continued to be moved to the right side in the three-dimensional space.

Further, suppose that the sole front part 301f is rotated around the sole back part 301b in the foot-part position indicating instrument 300 as illustrated in FIGS. 17C and 17D. In this case, the reference coordinate system (origin O, X-axis, Y-axis) rotates according to the position indication coordinate system (origin G, x-axis, y-axis). Therefore, as illustrated in FIG. 17C, the reference coordinate system (origin O, X-axis, Y-axis) corresponds with the position indication coordinate system (origin G, x-axis, y-axis). When the foot-part position indicating instrument 300 is moved forward, backward, leftward, or rightward in this state, the indication input similar to that of the case described with FIGS. 17A and 17B can be carried out.

Moreover, suppose that the centroid G moves to a position separate both from the X-axis and from the Y-axis as illustrated in FIG. 17E instead of moving on the X-axis or the Y-axis of the reference coordinate system as described with use of FIGS. 17A and 17B or FIGS. 17C and 17D. A movement distance n from the origin can be grasped as movement by +r in the Y-axis direction and by −l in the X-axis direction on the reference coordinate system in the foot-part position detecting device 400. In this case, it is possible to execute processing of continuing to enlarge the three-dimensional space image in such a manner that the point of view moves toward the front left side in the image processing device 700.

When what is generally called a joystick used as an input device in the existing technology is tilted toward, for example, the front side, enlarging a display image at a speed according to the tilt angle, for example, is possible. Specifically, the image can be changed in such a manner that the image slowly changes when the joystick is slightly tilted and the image changes fast when the joystick is greatly tilted. Indication input similar to this can be carried out by using the foot-part input system. Needless to say, not only the enlargement but indication input similar to indication input when the display image is changed through tilting the joystick in various directions can be carried out by using the foot-part input system.

In the second embodiment, the reference coordinate system defined on the operation surface 401 of the foot-part position detecting device 400 includes the center of the operation surface 401 as the origin O. Further, the orientation of the X-axis and the Y-axis of the reference coordinate system is settled based on the x-axis and the y-axis of the position indication coordinate system dependent on the three position indicating units 303L, 303R, and 303C of the foot-part position indicating instrument 300. As above, by detecting how the centroid G of the foot-part position indicating instrument 300 moves in the settled reference coordinate system and detecting the movement speed thereof, enlargement and reduction of the three-dimensional space image, movement of the point of view to the left and right, and so forth can be flexibly carried out.

Effects of Embodiment

In the image processing system of the above-described embodiment, the viewing direction is changed by rotation of the HMD 500, and the three-dimensional space image can be changed according to this. In addition to this, by using the foot-part input system, enlargement, reduction, leftward movement, and rightward movement of the three-dimensional space image can be implemented through carrying out forward movement, backward movement, leftward movement, and rightward movement of the foot-part position indicating instrument 300 on the operation surface 401 of the foot-part position detecting device 400.

This enables flexible indication input by use of the foot-part input system. Further, the displayed three-dimensional space image can be changed through inputting various kinds of information to the image processing device by using a foot part of the user in order not to cause a difference between the three-dimensional space image that changes and a feeling with respect to the motion of the body of the user. Because it is possible to avoid the occurrence of a difference between the three-dimensional space image that changes and a feeling with respect to the motion of the body of the user as above, causing a symptom such as what is generally called VR sickness in the user can also be suppressed.

Modification Examples

Variations of Setting Positions of Position Indicating Units

In the above-described first embodiment, the case in which the position indicating unit 101U is disposed at the sole front part 101 and the position indicating unit 103U is disposed at the sole back part 103 has been explained. Further, in the second embodiment, the case in which the left position indicating unit 303L, the right position indicating unit 303R, and the back position indicating unit 303C are disposed at the sole back part 301b has been explained. However, the configuration is not limited thereto. The way of disposing the position indicating units has various variations.

Figure 18A:
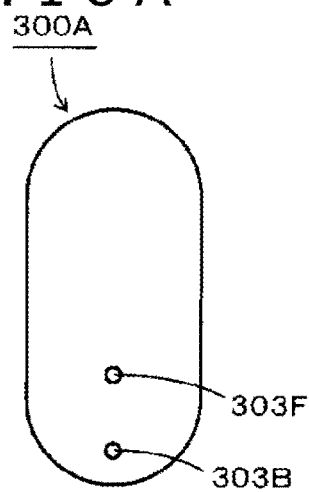
FIGS. 18A to 18F are diagrams for explaining variations of setting positions of position indication signal transmitting parts of a foot-part position indicating instrument.

FIGS. 18A to 18F are diagrams for explaining variations of the setting positions of the position indicating units (position indication signal transmitting parts) of the foot-part position indicating instrument. The upper side of the diagram is the toe side (sole front part), and the lower side of the diagram is the heel side (sole back part). A foot-part position indicating instrument 300A of FIG. 18A is an instrument in which two position indicating units 303F and 303B are disposed for the sole back part in the longitudinal direction. By disposing the two position indicating units 303F and 303B in the longitudinal direction of the foot-part position indicating instrument 300A as above, a position indication coordinate system in which a straight line that connects the two position indicating units 303F and 303B is the y-axis and a straight line orthogonal to the y-axis is the x-axis can be formed, and the movement direction can be identified.

For the amount of movement, either one of the position indicating unit 303F and the position indicating unit 303B is employed as the basis or the midpoint of a line segment that links the position indicating unit 303F and the position indicating unit 303B is employed as the basis, and the distance from the origin O can be obtained as the amount of movement. Besides, a position in the foot-part position indicating instrument 300A identified according to the position of one or both of the position indicating unit 303F and the position indicating unit 303B can be employed as the basis when the amount of movement is obtained.

Figure 18B:
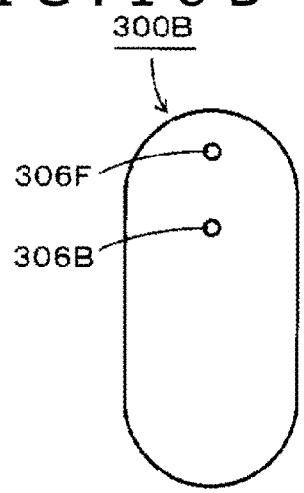

A foot-part position indicating instrument 300B of FIG. 18B illustrates a case in which two position indicating units 306F and 306B are disposed for the sole front part in the longitudinal direction. Therefore, the foot-part position indicating instrument 300A of FIG. 18A and the foot-part position indicating instrument 300B of FIG. 18B have the difference of whether the positions at which the position indicating units are disposed are on the feel side or the toe side. However, also in the case of the foot-part position indicating instrument 300B illustrated in FIG. 18B, the position indication coordinate system can be formed and the movement direction can be identified, and detection of the amount of movement is possible, similarly to the case of the foot-part position indicating instrument 300A illustrated in FIG. 18A.

Figure 18C:
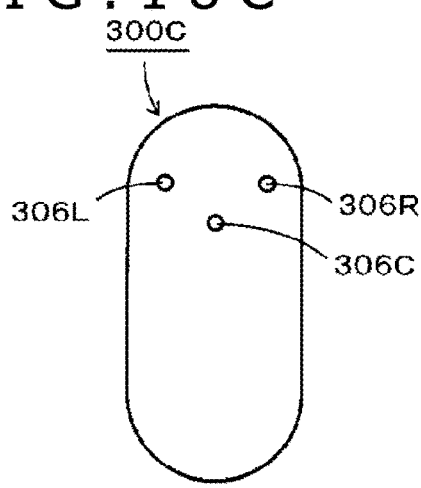

A foot-part position indicating instrument 300C of FIG. 18C illustrates a case in which three position indicating units 306L, 306R, and 306C are disposed to form an isosceles triangle at the sole front part. Therefore, the foot-part position indicating instrument 300 of the second embodiment described with use of FIGS. 9A and 9B, FIGS. 11A to 11C, and so forth and the foot-part position indicating instrument 300C of FIG. 18C have the difference of whether the positions at which the position indicating units are disposed are on the feel side or the toe side. However, also in the case of the foot-part position indicating instrument 300C illustrated in FIG. 18C, the position indication coordinate system can be formed and the movement direction can be identified, and detection of the amount of movement is possible, similarly to the case of the foot-part position indicating instrument 300 of the second embodiment described with use of FIGS. 9A and 9B, FIGS. 11A to 11C, and so forth.

Figure 18D:
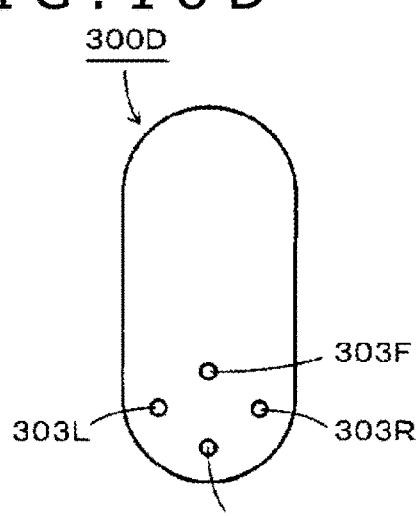

A foot-part position indicating instrument 300D of FIG. 18D illustrates a case in which four position indicating units 303L, 303R, 303F, and 303B are disposed to form a quadrangle at the sole back part. In this case, a position indication coordinate system in which a straight line that connects the position indicating units 303F and 303B is the y-axis and a straight line that connects the position indicating units 303L and 303R is the x-axis can be formed, and the movement direction can be identified. For the amount of movement in the case of this example, for example, the center of the quadrangle formed by the position indicating units 303L, 303R, 303F, and 303B is employed as the basis, and the distance from the origin O can be obtained as the amount of movement. Besides, a position in the foot-part position indicating instrument 300D identified according to one or more positions of the position indicating units 303L, 303R, 303F, and 303B can be employed as the basis when the amount of movement is obtained.

Figure 18E:
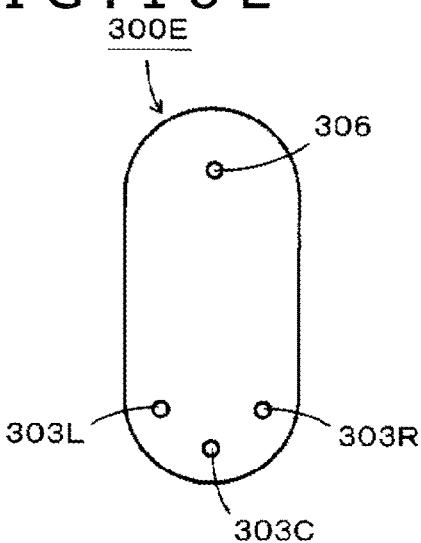
Figure 18F:
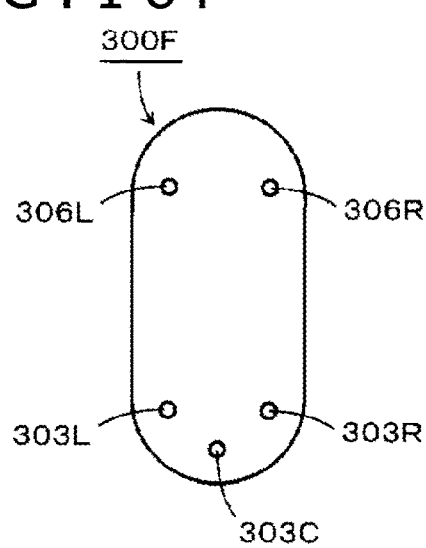

A foot-part position indicating instrument 300E of FIG. 18E illustrates a case in which three position indicating units 303L, 303R, and 303C are disposed to form an isosceles triangle at the sole back part and one position indicating unit 306 is disposed at the sole front part. Further, a foot-part position indicating instrument 300F of FIG. 18F illustrates a case in which three position indicating units 303L, 303R, and 303C are disposed to form an isosceles triangle at the sole back part and two position indicating units 306L and 306R are disposed at the sole front part.

In the cases of the foot-part position indicating instruments 300E and 300F, the position indication coordinate system can be formed and the movement direction can be identified, and detection of the amount of movement is possible, similarly to the case of the foot-part position indicating instrument 300 of the second embodiment described with use of FIGS. 9A and 9B, FIGS. 11A to 11C, and so forth. Moreover, in the cases of the foot-part position indicating instruments 300E and 300F, the position indicating units are disposed at the sole back part and the sole front part.

Due to this, as described with use of FIGS. 5A and 5B, when the sole front part (toe side) is raised with the sole back part (heel side) kept contact with the operation surface 401, it becomes possible to obtain the height h and the angle $\theta$ thereof. Conversely to this, when the sole back part (heel side) is raised with the sole front part (toe side) kept contact with the operation surface 401, it becomes possible to obtain the height h and the angle $\theta$ thereof. That is, the height h can be detected according to the voltage level in the position detecting sensor 201 regarding a signal transmitted from the position indicating unit.

Further, in the case of the foot-part position indicating instrument 300E, the angle $\theta$ can be obtained based on the obtained height h and the distance l (ell) from the centroid G of the isosceles triangle formed by the three position indicating units disposed at the sole back part to the position indicating unit 306. Moreover, in the case of the foot-part position indicating instrument 300F, the angle $\theta$ can be obtained based on the obtained height h and the distance l (ell) from the centroid G of the isosceles triangle formed by the three position indicating units disposed at the sole back part to the midpoint between the position indicating units 306L and 306R.

Supplying the height h and the angle $\theta$ obtained in this manner to the image processing device 700 makes it possible to execute various kinds of image processing in the image processing device 700. For example, it becomes possible to execute enlargement-reduction processing in which enlargement of the three-dimensional space image is carried out when the sole front part is raised and reduction of the three-dimensional space image is carried out when the sole back part is raised. Further, it becomes possible to execute upward-downward movement processing of the position of the point of view in which the position of the point of view in the three-dimensional space image is moved in the upward direction when the sole front part is raised, the position of the point of view in the three-dimensional space image is moved in the downward direction when the sole back part is raised, and the three-dimensional space image in that case is displayed.

The latter, i.e., the upward-downward movement processing of the position of the point of view, is what allows ascent and descent in the three-dimensional space image. Therefore, this processing is different from processing of displaying the three-dimensional space image when the viewing direction is changed without changing the position of the point of view through moving the head on which the HMD 500 is mounted in such a manner as to look up or moving the head on which the HMD 500 is mounted in such a manner as to look down. As above, by supplying the image processing device 700 with the height h and the angle θ that can be detected through raising and lowering of the sole front part and the sole back part, new image processing that utilizes this is enabled.

Variations of the setting positions of the position indicating units (position indication signal transmitting parts) of the foot-part position indicating instrument are not limited to those illustrated in FIGS. 18A to 18F. The position indicating units can be disposed in various forms with which the position indication coordinate system composed of the y-axis and the x-axis can be formed and the amount of movement of the foot-part position indicating instrument 300 can be detected. Therefore, the position indicating units may be disposed to form a polygon such as a pentagon or hexagon besides being disposed to form a triangle and being disposed to form a quadrangle.

Further, in each of the foot-part position indicating instruments 300A to 300F illustrated in FIGS. 18A to 18F, the respective position indicating units transmit a transmission signal with different frequencies. In this case, the foot-part position detecting device 400 grasps the correspondence between the position at which the position indicating unit is disposed and the frequency of the transmission signal transmitted by this position indicating unit and can discriminate and detect the position indicated by each position indicating unit.

Moreover, two position indicating units disposed to form an isosceles triangle may be allowed to transmit a transmission signal with the same frequency. Further, a position may be indicated in such a manner that plural position indicating units are disposed and transmission of the position indication signal is switched in a time-sharing manner in order decided in advance. Therefore, in this case, the frequency of the transmission signal does not need to be changed for each position indicating unit. This is because, in this case, the position indicating units can be recognized as ones located at both ends of the base and the direction in which they are disposed can also be recognized based on the position indicating unit located at the vertex.

Continuation of Enlargement or Reduction

Further, in the above-described embodiment, it has been explained that enlargement and reduction of the three-dimensional space image are carried out according to the movement direction and the amount of movement. However, it is also possible to carry out enlargement and reduction more flexibly. For example, suppose that the foot-part position indicating instrument 300 is moved forward, the movable range restricting plate 304 of the foot-part position indicating instrument 300 engages with the ring-shaped protrusion part 403 of the operation surface 401, and the foot-part position indicating instrument 300 becomes incapable of moving. Even in this case, by pressing down the sole back part 301*b*, the pressing force can be detected in the position indicating unit and be supplied to the image processing device 700 via the foot-part position detecting device 400.

Thus, in the image processing device 700, enlargement of the three-dimensional space image can be continued when the pressing force from the foot-part position indicating instrument 300 is equal to or higher than a certain value, and the enlargement of the three-dimensional space image can be stopped when the pressing force has become lower than the certain value. Similarly, suppose that the foot-part position indicating instrument 300 is moved backward, the movable range restricting plate 304 of the foot-part position indicating instrument 300 engages with the ring-shaped protrusion part 403 of the operation surface 401, and the foot-part position indicating instrument 300 becomes incapable of moving. In this case, in the image processing device 700, reduction of the three-dimensional space image can be continued when the pressing force from the foot-part position indicating instrument 300 is equal to or higher than a certain value, and the reduction of the three-dimensional space image can be stopped when the pressing force has become lower than the certain value.

Although the pressure value from the position indicating unit of the foot-part position indicating instrument 300 is used here, the configuration is not limited thereto. For example, when the foot-part position indicating instrument 300 is moved forward, enlargement of the three-dimensional space image may be continued until the movement turns to backward movement. Similarly, when the foot-part position indicating instrument 300 is moved backward, reduction of the three-dimensional space image may be continued until the movement turns to forward movement. In this case, the foot-part position indicating instrument 300 is moved forward and, when the three-dimensional space image is enlarged to the target state, the foot-part position indicating instrument 300 is slightly moved backward. This can stop the enlargement of the three-dimensional space image. Similarly, the foot-part position indicating instrument 300 is moved backward and, when the three-dimensional space image is reduced to the target state, the foot-part position indicating instrument 300 is slightly moved forward. This can stop the reduction of the three-dimensional space image.

Configuration of Foot-Part Position Indicating Instrument

Further, the configuration of the foot-part position indicating instrument 300 is also not limited to the above-described configuration. It suffices that the foot-part position indicating instrument 300 be what can be mounted on a foot part of a user similarly to what is generally called footwear such as a slipper, a sandal, and a sneaker and allows mounting (incorporation) of the position indicating unit therein. In this case, it is desirable that the sole central part that connects the sole front part and the sole back part be formed of a material (ingredient) that bends. The purpose thereof is to allow easy execution of operation of raising the toe side with the heel side kept contact with the operation surface 401 or raising the heel side with the toe side kept contact with the operation surface 401.

Further, in the case of the foot-part position indicating instrument 300 of the above-described second embodiment, the foot-part position indicating instrument 300 includes the toe-side belt holding parts 301L and 301R and the heel-side belt holding parts 302L and 302R and is mounted on a foot part of a user by belts made to pass through them. However, the configuration is not limited thereto. A holding part that covers the upper part of the toe part may be disposed in advance as in a slipper or a sandal, or a holding part that covers side surfaces of the foot part and the upper part of the toe part may be disposed as in a general shoe such as a sneaker.

Setting of Mode

Moreover, in the above-described embodiment, a mode in which enlargement and reduction of an image and movement of the point of view to the left and right are enabled through forward movement, backward movement, leftward movement, and rightward movement of the foot-part position indicating instrument 300 is defined as a first mode. By changing the three-dimensional space image by operation with the foot part as above, the occurrence of a symptom such as what is generally called VR sickness can be suppressed. In addition, a mode in which only enlargement and reduction of an image are enabled through forward movement and backward movement of the foot-part position indicating instrument 300 is defined as a second mode. In this case, the occurrence of VR sickness can be further suppressed. Therefore, using the mode according to the situation is allowed. For example, a user who is less liable to suffer from VR sickness uses the first mode whereas a user who is more liable to suffer from VR sickness uses the second mode.

Use of Flat Coil

As the coil for the resonant circuit that can be used for the foot-part position indicating instruments 100 and 300, there are a cylindrical coil formed into a cylindrical shape through winding an insulated conductor line into a helical shape and a flat coil formed into a thin shape through winding an insulated conductor line into, for example, a spiral shape. The height of the cylindrical coil is equal to or higher than, for example, 10 mm in many cases. Therefore, it is conceivable that the cylindrical coil is disposed along the outer edge of what is generally called the sole (shoe sole) part of the foot-part position indicating instrument 100 or 300, such as the part at the periphery of the heel of the user of the foot-part position indicating instrument 100 or 300 or the part at the periphery of the toe. This is because the sole becomes thick when disposing the cylindrical coil at the sole-of-foot part of the foot-part position indicating instrument 100 or 300 is attempted.

In contrast, in the case of the flat coil, the thickness is as thin as, for example, several millimeters, approximately. Therefore, the thickness of the sole part can be suppressed even when the flat coil is disposed at the sole-of-foot part of the foot-part position indicating instrument. Further, in the case of the flat coil, change in magnetic flux due to tilt is less liable to occur and therefore, it becomes easy to obtain a signal with less variation with respect to physical motion. Thus, as a more specific modification example of the foot-part position indicating instrument, a foot-part position indicating instrument 800 including flat coils disposed at the sole-of-foot part of the sole part will be described.

Figure 19A:
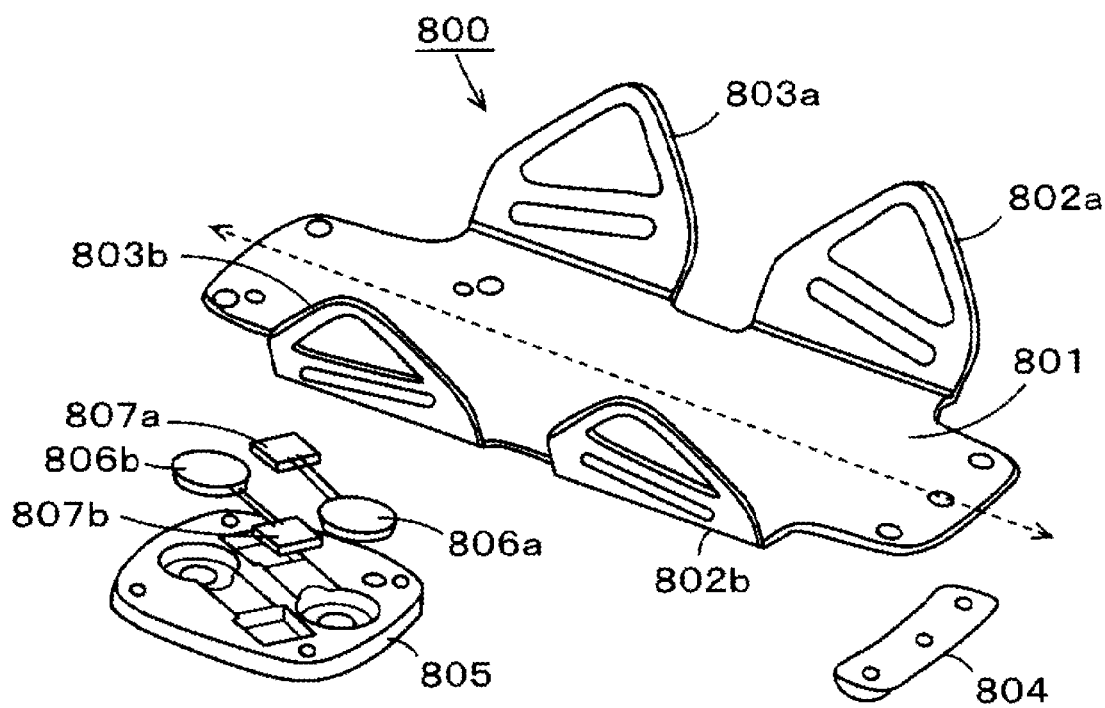
FIGS. 19A and 19B each depict a diagram for explaining a foot-part position indicating instrument configured with use of flat coils.
Figure 19B:
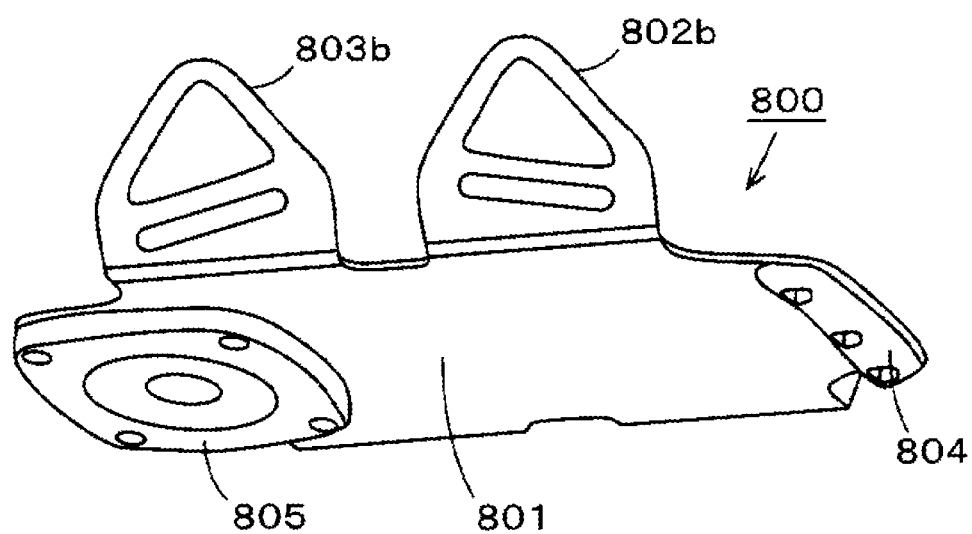

FIGS. 19A and 19B each depict a diagram for explaining the foot-part position indicating instrument 800 configured with use of flat coils. In FIGS. 19A and 19B, FIG. 19A is a diagram of a case where the foot-part position indicating instrument 800 is viewed from an obliquely upper side, and FIG. 19B is a diagram of a case where the foot-part position indicating instrument 800 is viewed from an obliquely lower side. As illustrated in FIG. 19A, the foot-part position indicating instrument 800 includes a sole part 801 with a substantially rectangular shape and belt holding parts 802*a*, 803*a*, 802*b*, and 803*b* disposed at the long sides of the sole part 801. Moreover, a protrusion part 804 for movable range restriction and a board 805 for movable range recognition are disposed on the back surface (lower-side surface) of the sole part 801.

The part composed of the sole part 801, the belt holding parts 802*a* and 803*a*, and the belt holding parts 802*b* and 803*b* is monolithically formed by a material that is flexible and is hard to break, such as a polycarbonate/acrylonitrile butadiene styrene (ABS) resin that is a thermoplastic resin combining characteristics of a polycarbonate resin and an ABS resin, for example. In each of the belt holding parts 802*a* and 803*a* and the belt holding parts 802*b* and 803*b*, a triangular opening is a heel fixing band through-hole, and an elongated opening on the lower side thereof is an instep fixing band through-hole. As illustrated in FIG. 19A, the belt holding part 802*a* and the belt holding part 802*b* are mirror symmetric. Further, the belt holding part 803*a* and the belt holding part 803*b* are mirror symmetric. This allows the foot-part position indicating instrument 800 to be mounted on a foot of a user, irrespective of the front-back/left-right orientation also as described later.

In FIG. 19A, the protrusion part 804 for movable range restriction and the board 805 for movable range recognition that have not yet been attached to the sole part 801 are illustrated. They are what are attached to the back surface of the sole part 801 also as described later. The protrusion part 804 for movable range restriction and the board 805 for movable range recognition are formed by using a material having favorable wear resistance and slipperiness, such as a polyacetal (POM) resin. As illustrated in FIG. 19A, the board 805 for movable range recognition has a predetermined thickness and has inside thereof two coil-and-others fixing recesses each composed of a circular recess and a rectangular recess.

A flat coil 806*a* and a circuit substrate 807*a* are fitted in one coil-and-others fixing recess of the board 805 for movable range recognition, and a flat coil 806*b* and a circuit substrate 807*b* are fitted in the other coil-and-others fixing recess. Circuit components such as a capacitor are mounted in each of the circuit substrates 807*a* and 807*b*. One resonant circuit is configured by the flat coil 806*a* and the circuit substrate 807*a*, and another resonant circuit is configured by the flat coil 806*b* and the circuit substrate 807*b*. Due to this, two resonant circuits are mounted in the board 805 for movable range recognition. The resonant frequency is different between the resonant circuit configured by the flat coil 806*a* and the circuit substrate 807*a* and the resonant circuit configured by the flat coil 806*b* and the circuit substrate 807*b*.

As illustrated in FIG. 19B, the protrusion part 804 for movable range restriction is fixed to one end part of the back surface of the sole part 801, and the board 805 for movable range recognition is fixed to the other end part of the back surface of the sole part 801. The protrusion part 804 for movable range restriction is, for example, what engages with the outer edge of the operation surface of the foot-part position detecting device 400 and allows recognition of the range of the operation surface 401 of the foot-part position detecting device 400. The resonant circuits mounted inside the board 805 for movable range recognition function as position indicating units, and the board 805 for movable range recognition implements a function of carrying out position indication to the foot-part position detecting device 400.

Figure 20:
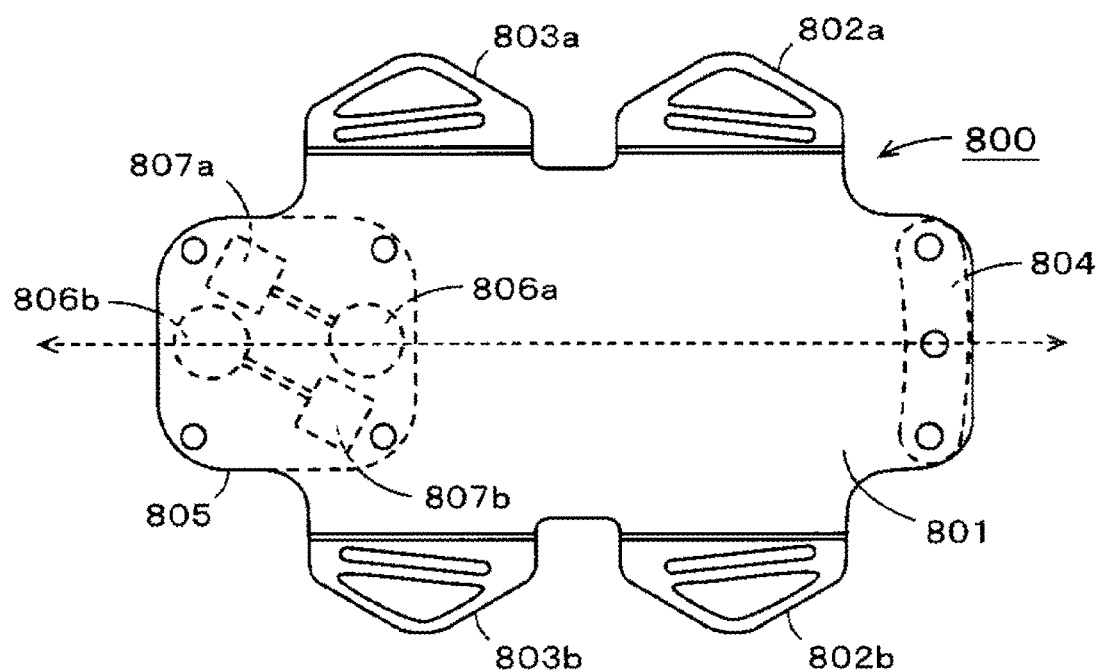
FIG. 20 is a diagram for explaining the foot-part position indicating instrument configured with use of the flat coils.

FIG. 20 is a diagram for explaining the foot-part position indicating instrument 800 configured with use of the flat coils and illustrates a case in which the foot-part position indicating instrument 800 is viewed from the upper surface (front surface) side. Thus, the protrusion part 804 for movable range restriction, the board 805 for movable range recognition, and so forth attached to the back surface of the sole part 801 are illustrated by dotted lines. In the foot-part position indicating instrument 800, the center of each of the flat coils 806*a* and 806*b* is disposed to be located on the center line of the sole part 801 illustrated by a dotted line given arrows. This arrangement corresponds to the arrangement illustrated in FIGS. 18A and 18B.

Due to this, when the foot-part position indicating instrument 800 is moved forward, backward, leftward, and rightward on the foot-part position detecting device 400, the position according to the movement can be indicated by carrying out transmission and reception of a magnetic field between the flat coils 806*a* and 806*b* and the foot-part position detecting device 400. Therefore, the foot-part position indicating instrument 800 can be used on the foot-part position detecting device 400 similarly to the foot-part position indicating instrument 300 of the above-described second embodiment.

Figure 21A:
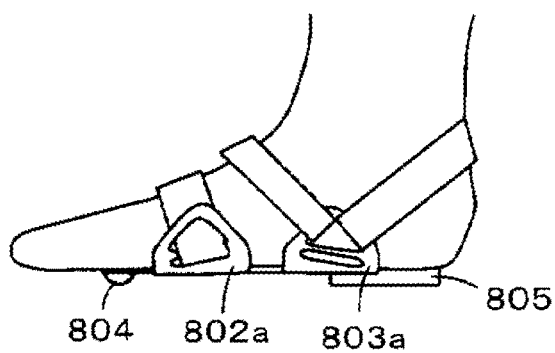
FIGS. 21A and 21B are diagrams for explaining use examples of the foot-part position indicating instrument configured with use of the flat coils.
Figure 21B:
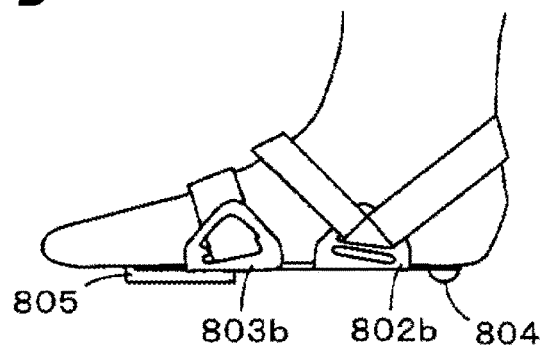

FIGS. 21A and 21B are diagrams for explaining the forms of attaching of the foot-part position indicating instrument 800 to a foot part of a user. As illustrated in FIG. 19A and FIG. 20 and also as described above, the belt holding part 802a and the belt holding part 803a are mirror symmetric, and the belt holding part 802b and the belt holding part 803b are mirror symmetric. Thus, the foot-part position indicating instrument 800 can be fixed to a foot part of a user, irrespective of the front-back/left-right orientation of the foot part of the user.

Specifically, as illustrated in FIG. 21A, the foot-part position indicating instrument 800 can be fixed to the foot part of the user in such a manner that the protrusion part 804 for movable range restriction is set on the toe side and the board 805 for movable range recognition is set on the heel side. Further, as illustrated in FIG. 21B, the foot-part position indicating instrument 800 can be fixed to the foot part of the user in such a manner that the protrusion part 804 for movable range restriction is set on the heel side and the board 805 for movable range recognition is set on the toe side. Moreover, the foot-part position indicating instrument 800 can be similarly fixed to the foot part of either side of the left and right sides of the user.

As described with use of FIGS. 21A and 21B, the foot-part position indicating instrument 800 can be mounted on a foot part of a user with different orientations. In this case, the orientation of the foot-part position indicating instrument 800, i.e., which of the flat coil 806a and the flat coil 806 is located on the front side (toe side) and which of them is located on the back side (heel side) with respect to the foot part of the user, is set on software. Simply, when the board 805 for movable range recognition is located on the toe side, the setting can be made in such a manner that the flat coil 806b is located on the front side and the flat coil 806a is located on the back side with respect to the foot part. Further, when the board 805 for movable range recognition is located on the heel side, the setting can be made in such a manner that the flat coil 806b is located on the back side and the flat coil 806a is located on the front side with respect to the foot part.

Moreover, as described with use of FIG. 20, the flat coils 806a and 806b are each disposed in such a manner that the center is located on the center line of the sole part 801. That is, the flat coils 806a and 806b are disposed at the front and back with respect to the longitudinal direction of the sole part 801. For example, suppose that the toe is raised without separating the heel side from on the operation surface 401 of the foot-part position detecting device 400 in the case in which the foot-part position indicating instrument 800 is mounted in such a manner that the board 805 for movable range recognition is located on the heel side of a foot part of a user as illustrated in FIG. 21A.

In this case, the magnetic field (signal) from the flat coil 806b located closer to the back side of the foot part remains strong whereas the magnetic field (signal) from the flat coil 806a located closer to the front side of the foot part becomes weak or the magnetic field (signal) becomes undetectable. Such strength or undetectability of the magnetic field can be sensed on the side of the foot-part position detecting device 400 and therefore, this can be applied to input action of a button switch function, for example. Specifically, when the foot-part position indicating instrument 800 is mounted on the foot part of the user in the form illustrated in FIG. 21A, processing according to action, such as switch-on when the toe is raised and switch-off when the toe is lowered, becomes possible. More specifically, processing according to action, such as making a jump when the toe is raised, becomes possible.

Similarly, suppose that the heel is raised without separating the toe side from on the operation surface 401 of the foot-part position detecting device 400 in the case in which the foot-part position indicating instrument 800 is mounted in such a manner that the board 805 for movable range recognition is located on the toe side of a foot part of a user as illustrated in FIG. 21B. In this case, the magnetic field (signal) from the flat coil 806b located closer to the front side of the foot part remains strong whereas the magnetic field (signal) from the flat coil 806a located closer to the back side of the foot part becomes weak or the magnetic field becomes undetectable. Thus, when the foot-part position indicating instrument 800 is mounted on the foot part of the user in the form illustrated in FIG. 21B, processing according to action, such as switch-on when the heel is raised and switch-off when the heel is lowered, becomes possible. More specifically, processing according to action, such as making a jump when the heel is raised (user stands on tiptoe), becomes possible.

Further, it is also possible to execute processing in which how much the toe or heel is raised is estimated according to the difference in the strength of the magnetic field (signal) between the flat coil 806a and the flat coil 806b, the angle of depression of the angle of elevation is settled, and a display image is changed. In addition, also in the case of using flat coils, it is also possible to dispose the flat coils in not only the form illustrated in FIGS. 18A and 18B but also the forms illustrated in FIGS. 18C to 18F.

Moreover, it has been explained that the resonant circuits are configured by connecting a capacitor to each of the flat coils 806a and 806b in the case of the foot-part position indicating instrument 800 described with use of FIGS. 19A to 21B. However, the configuration is not limited thereto. In addition, needless to say, it is also possible to further connect a pressure sensor in parallel to the resonant circuit configured by the flat coil and the capacitor to configure the position indicating unit with the form described with use of FIGS. 3A to 3C and use it.

Further, in the case of the above-described foot-part position indicating instrument 800, the configuration in which two resonant circuits with different resonant frequencies are mounted is made and therefore, the number of resonant frequencies for which the side of the foot-part position detecting device 400 is caused to make a scan can be set to two. That is, the number of resonant frequencies that should be detected can be made smaller than with the foot-part position indicating instrument in which three or more resonant circuits with different resonant frequencies are mounted. Therefore, the scan rate is improved, and higher frequent acquisition of indicated-position information is enabled.

Moreover, it is also possible to adjust the positions, relative to the sole of the foot part of the user, of the protrusion part 804 for movable range restriction and the board 805 for movable range recognition, by adjusting the length of the belts made to pass through the belt holding parts 802a and 802b and the belt holding parts 803a and 803b. This makes it possible to mount the foot-part position indicating instrument 800 on the foot part in a form with which ease of use is felt for each user. That is, the usability of the foot-part position indicating instrument can be improved for each user.

There may be employed configuration that is obtained by removing the toe side including the belt holding parts 802 of the foot-part position indicating instrument 800 and disposing a heel part configured by the belt holding parts 803 and the board 805 for movable range recognition on the arch of the sole of the foot. That is, it is also possible to make the foot-part position indicating instrument into more simplified one configured by the belt holding parts 803 and the board 805 for movable range recognition.

Other Modification Examples

In the case of the second embodiment, an instruction is issued to the image processing device 700 to change a three-dimensional space image displayed on the HMD 500. However, the configuration is not limited thereto. It is also possible to use the foot-part input system composed of the foot-part position indicating instrument 300 and the foot-part position detecting device 400 of the second embodiment also in the case of changing an image displayed on the display DP in the case of the first embodiment.

It has been explained that, as illustrated in FIG. 10A, the origin O of the reference coordinate system is fixed at the center of the circular movable range restriction region 402 set on the operation surface 401 of the foot-part position detecting device 400. However, the configuration is not limited thereto. For example, a consideration will be made by taking as an example the case of using the foot-part input system composed of the foot-part position indicating instrument 300 and the foot-part position detecting device 400 of the above-described second embodiment.

The position indication coordinate system in this case is identified according to the positions of the position indicating units 303L, 303R, and 303C as described above. Further, the position of the centroid G when the sole back part 301*b* is pressed and a pressure equal to or higher than a predetermined value is detected by one or more of the position indicating units 303L, 303R, and 303C is defined as the origin O. Thereafter, when the pressure relating to the position indicating units 303L, 303R, and 303C lowers and forward movement, backward movement, leftward movement, or rightward movement is made, sensing of how far and in which direction the centroid G moves from the identified origin O in the identified position indication coordinate system is allowed. Therefore, in the case of this example, the position of the centroid G can be defined as the origin O every time the sole back part 301*b* is pressed and a pressure equal to or higher than a predetermined value is detected by one or more of the position indicating units 303L, 303R, and 303C.

Further, in the above-described second embodiment, the HMD 500 has been explained as what includes the display HDP and the six-axis sensor. However, the HMD 500 is not limited thereto. The HMD 500 may have a camera function and may photograph an image in the direction in which the user who wears the HMD 500 on the head is oriented, to supply the image to the image processing device 700. In this case, three-dimensional space image data obtained by executing image processing such as addition of an image of an avatar or the like for the photographed image supplied from the HMD 500 can be formed in the image processing device 700, and it can be supplied to the HMD 500 and be displayed. As above, it is also possible to display, on the HMD 500, a three-dimensional space image according to three-dimensional image data formed through adding processing to an image photographed in real time through the camera mounted in the HMD 500.

Others

As is understood also from the explanation of the above-described embodiment, functions of the foot-part position indicating instrument in the claims are implemented by the foot-part position indicating instrument 300 and so forth of the embodiment. Further, functions of the sole part, the sole front part, and the sole back part of the claims are implemented by the sole part 301, the sole front part 301*f*, and the sole back part 301*b* of the embodiment. Moreover, functions of the position indication signal transmitting part of the claims are implemented by the position indicating units 303L, 303R, and 303C and so forth of the embodiment.

Further, functions of the foot-part position detecting device of the claims are implemented by the foot-part position detecting device 400 and so forth of the embodiment. Moreover, functions of the position detecting sensor of the claims are implemented by the position detecting sensor 201 of the embodiment, and functions of the detecting circuit of the claims are implemented by the detecting circuit 202 of the embodiment. Further, functions of the operation surface in the claims are implemented by the operation surface 401 of the embodiment. Functions of the mounting component in the claims are implemented by the belts attached to the belt holding parts 301L, 301R, 302L, and 302R in the embodiment.

A series of methods in which the direction of movement carried out in the foot-part input system composed of the foot-part position indicating instrument 300 and the foot-part position detecting device 400 of the above-described second embodiment is detected and is supplied to the image processing device 700 is one embodiment of the indicated position input method using a foot-part input system.

It is to be noted that the embodiment of the present disclosure is not limited to the foregoing embodiments, and that various changes can be made without departing from the spirit of the present disclosure.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A foot-part input system comprising:
   a foot-part position indicating instrument that, in operation, is mounted on a foot of a user; and
   a foot-part position detecting device that is separate from the foot-part position indicating instrument, wherein:
   the foot-part position indicating instrument is movable with respect to the foot-part position indicating instrument,
   the foot-part position detecting device, in operation, detects a position on the foot-part position detecting device indicated by the foot-part position indicating instrument, the foot-part input system, in operation, supplies, to an image processing device, detection output supplied from the foot-part position detecting device, the foot-part position indicating instrument includes:
- a sole part, and
- a position indication signal transmitting part that is disposed at the sole part and that, in operation, transmits a position indication signal, and the foot-part position detecting device includes:
- a position detecting sensor that includes a plurality of electrodes disposed at predetermined intervals in each of a first direction and a second direction orthogonal to the first direction and that, in operation, receives the position indication signal from the position indication signal transmitting part, and generates output regarding each of the plurality of electrodes,
- a detecting circuit that, in operation, detects, as forward movement, movement of the sole part in a direction along a center axis of the sole part in a longitudinal direction and is an extension direction of a line extended in a direction from a heel of the foot of the user toward a toe of the foot of the user, and detects, as backward movement, movement of the sole part in an extension direction of a line extended in a direction from the toe of the foot of the user toward the heel of foot of the user, based on an output signal from the position detecting sensor, and
- a circular operation surface that is separate from the position detection sensor, the circular operation surface being disposed over the position detecting sensor such that the circular operation surface, in operation, is disposed between the foot-part position indicating instrument and the position detection sensor.

2. The foot-part input system according to claim 1, wherein,
based on the output signal from the position detecting sensor, the detecting circuit of the foot-part position detecting device, in operation, detects first movement of the sole part as leftward movement when the sole part moves in a direction intersecting an extended line extended in a direction from the heel of the foot of the user toward the toe of the foot of the user and to a left side of the extended line, and detects second movement of the sole part as rightward movement when the sole part moves to a right side of the extended line.

3. The foot-part input system according to claim 1, wherein:
the foot-part position indicating instrument includes a plurality of position indication signal transmitters,
the position indication signal transmitters are disposed at the sole part, and
the position indication signal transmitters, in operation, respectively transmit position indication signals with different frequencies.

4. The foot-part input system according to claim 1, wherein:
the foot-part position indicating instrument includes two or more position indication signal transmitters disposed lined up in the longitudinal direction of the sole part, and
the position indication signal transmitters, in operation, respectively transmit position indication signals with different frequencies.

5. The foot-part input system according to claim 1, wherein:
the foot-part position indicating instrument includes a plurality of position indication signal transmitters,
one of the position indication signal transmitters of the foot-part position indicating instrument is disposed at each of a plurality of vertexes of a polygon at the sole part, and
the position indication signal transmitters, in operation, respectively transmit position indication signals with different frequencies.

6. The foot-part input system according to claim 1, wherein:
the detecting circuit of the foot-part position detecting device, in operation, detects an amount of movement of the position indicated by the foot-part position indicating instrument identified based on the position indication signal and the output signal from the position detecting sensor.

7. The foot-part input system according to claim 1, wherein:
the position detecting sensor has a quadrangle shape.

8. The foot-part input system according to claim 1, wherein:
the detecting circuit of the foot-part position detecting device, in operation, transforms the position indicated by the foot-part position indicating instrument based on the position indication signal to polar coordinates and outputs the polar coordinates.

* * * * *